US010445539B2

(12) United States Patent
Hattori

(10) Patent No.: US 10,445,539 B2
(45) Date of Patent: Oct. 15, 2019

(54) UHF BAND RFID SYSTEM AND UHF BAND RFID TAG DETECTION METHOD

(71) Applicant: NEC Corporation, Tokyo (JP)

(72) Inventor: Wataru Hattori, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 3 days.

(21) Appl. No.: 15/566,255

(22) PCT Filed: Jan. 27, 2016

(86) PCT No.: PCT/JP2016/000386
§ 371 (c)(1),
(2) Date: Oct. 13, 2017

(87) PCT Pub. No.: WO2016/174797
PCT Pub. Date: Nov. 3, 2016

(65) Prior Publication Data
US 2018/0089475 A1 Mar. 29, 2018

(30) Foreign Application Priority Data

Apr. 27, 2015 (JP) ................................. 2015-090603

(51) Int. Cl.
*G06K 7/10* (2006.01)
*G06K 19/07* (2006.01)
(Continued)

(52) U.S. Cl.
CPC ..... *G06K 7/10346* (2013.01); *G06K 7/10009* (2013.01); *G06K 7/10445* (2013.01);
(Continued)

(58) Field of Classification Search
CPC . G06K 7/08; G06K 7/00; G06K 19/06; G06F 17/00
(Continued)

(56) References Cited

U.S. PATENT DOCUMENTS

2005/0134506 A1\* 6/2005 Egbert ............. G06K 19/07749
343/700 MS
2006/0232419 A1\* 10/2006 Tomioka ............... G06K 19/072
340/572.7
(Continued)

FOREIGN PATENT DOCUMENTS

JP 2006-197202 A 7/2006
JP 2008-109200 A 5/2008
(Continued)

OTHER PUBLICATIONS

International Search Report of PCT/JP2016/000386 dated Mar. 22, 2016 [PCT/ISA/210].

*Primary Examiner* — Edwyn Labaze
(74) *Attorney, Agent, or Firm* — Sughrue Mion, PLLC

(57) ABSTRACT

A UHF band RFID system according to the present invention includes a reader antenna that is composed of a matched-terminated open-type transmission line and is connected to a UHF band RFID reader, a first-type RFID tag installed, without being fixed to a managed object, in a managed object placement area in which the managed object is placed, and a second-type RFID tag that is fixed to the managed object and includes tag information for identifying the managed object. When the managed object is placed in the managed object placement area, the managed object is placed in a position where the reader antenna and an antenna of the first-type RFID tag are electric field coupled, and is also placed in a position where the reader antenna and an antenna of the second-type RFID tag are magnetic field coupled.

10 Claims, 10 Drawing Sheets

(51) Int. Cl.
  *G06K 19/077* (2006.01)
  *H04B 5/00* (2006.01)
(52) U.S. Cl.
  CPC ... *G06K 19/0723* (2013.01); *G06K 19/07758* (2013.01); *G06K 19/07773* (2013.01); *H04B 5/0075* (2013.01)
(58) Field of Classification Search
  USPC .............................. 235/451, 375, 439, 492
  See application file for complete search history.

(56) References Cited

U.S. PATENT DOCUMENTS

| | | | | |
|---|---|---|---|---|
| 2008/0129629 | A1* | 6/2008 | Kimura | H01Q 1/2208 343/788 |
| 2008/0150691 | A1* | 6/2008 | Knadle | G06K 7/0008 340/10.1 |
| 2008/0224833 | A1* | 9/2008 | Aikawa | G06K 7/0008 340/10.51 |
| 2010/0285746 | A1* | 11/2010 | Tsirline | G06K 17/0009 455/41.1 |
| 2011/0080271 | A1* | 4/2011 | Kai | G06K 7/10178 340/10.51 |
| 2011/0168787 | A1* | 7/2011 | Choo | G06K 19/07735 235/492 |
| 2012/0104103 | A1* | 5/2012 | Manzi | G06K 19/07749 235/492 |
| 2013/0021140 | A1* | 1/2013 | Forster | G06K 7/10178 340/10.1 |
| 2015/0235066 | A1 | 8/2015 | Hattori et al. | |
| 2015/0347795 | A1 | 12/2015 | Kosaka | |

FOREIGN PATENT DOCUMENTS

| | | |
|---|---|---|
| JP | 2010-016445 A | 1/2010 |
| JP | 2011-114633 A | 6/2011 |
| JP | 2012-117905 A | 6/2012 |
| WO | 2014/041715 A1 | 3/2014 |
| WO | 2014/087566 A1 | 6/2014 |

* cited by examiner

SIDE VIEW

Fig. 5

| DISTANCE r | $1/4 \cdot (\lambda/2\pi)$ ≒ $0.04\lambda$ | $1/2 \cdot (\lambda/2\pi)$ ≒ $0.08\lambda$ | $\lambda/2\pi$ ≒ $0.16\lambda$ | $2 \cdot (\lambda/2\pi)$ ≒ $0.32\lambda$ | $\lambda$ | $2\lambda$ |
|---|---|---|---|---|---|---|
| IN CASE OF 950 MHz | 1.3cm | 2.5cm | 5.0cm | 10.1cm | 31.6cm | 63.2cm |
| QUASI-ELECTROSTATIC FIELD ($1/r^3$) | 64 | 8 | 1 | $1/8$ ≒ $0.13$ | ≒ $0.004$ | ≒ $5 \times 10^{-4}$ |
| INDUCTION ELECTRIC FIELD ($1/r^2$) | 16 | 4 | 1 | $1/4$ ≒ $0.25$ | ≒ $0.025$ | ≒ $6 \times 10^{-3}$ |
| RADIATION ELECTRIC FIELD ($1/r$) | 4 | 2 | 1 | $1/2$ = $0.5$ | ≒ $0.16$ | ≒ $0.08$ | ered to as a "first communication characteristic") of the RFID tag when no managed object is placed in vicinity thereof is a characteristic when isolated.
UHF BAND RFID SYSTEM AND UHF BAND RFID TAG DETECTION METHOD

CROSS REFERENCE TO RELATED APPLICATIONS

This application is a National Stage of International Application No. PCT/JP2016/000386, filed Jan. 27, 2016, claiming priority based on Japanese Patent Application No. 2015-090603, filed Apr. 27, 2015, the contents of all of which are incorporated herein by reference in their entirety.

TECHNICAL FIELD

The present invention relates to a UHF band RFID system and a UHF band RFID tag detection method.

BACKGROUND ART

Systems managing presence or absence of a managed object by using an ultra-high frequency (UHF) band passive radio frequency identification (RFID) system becoming widespread in recent years have been proposed. For example, WO 2014/041715 being PTL 1 describes a method of placing an RFID tag in a managed object placement area instead of affixing an RFID tag to a managed object, and detecting presence or absence of the managed object in the managed object placement area, based on a strength or a phase of a reflected signal from the RFID tag, the strength or the phase being changed depending on a change in an antenna operating characteristic of the RFID tag based on presence or absence of the managed object.

On the other hand, technologies related to an RFID system performing inventory management by affixing an RFID tag to a managed object are disclosed in, for example, Japanese Unexamined Patent Application Publication No. 2011-114633 being PTL 2, "ANTENNA DEVICE, AND SYSTEM INCLUDING ANTENNA DEVICE," Japanese Unexamined Patent Application Publication No. 2012-117905 being PTL 3, "RFID TAG POSITION DETECTION DEVICE AND RFID TAG POSITION DETECTION METHOD," and Japanese Unexamined Patent Application Publication No. 2006-197202 being PTL 4, "INFORMATION SYSTEM USING ELECTRONIC TAG AND ELECTRONIC TAG."

The technologies disclosed in aforementioned PTLs 2 to 4 affix an RFID tag to a managed object, and when tag information of the RFID tag receiving a signal radiated from an RFID reader antenna can be read, determine that the managed object corresponding to the tag information exists within a range in which tag information of the RFID tag can be read from the RFID reader antenna. On the other hand, when tag information of the RFID tag cannot be read, the technologies determine that the managed object corresponding to the tag information does not exist within the range in which tag information of the RFID tag can be read from the RFID reader antenna. Thus, the technologies disclosed in aforementioned PTLs 2 to 4 manage presence or absence of a managed object while identifying the managed object by reading tag information affixed to the managed object.

CITATION LIST

Patent Literature

PTL 1: International Application Publication No. WO 2014/041715

PTL 2: Japanese Unexamined Patent Application Publication No. 2011-114633

PTL 3: Japanese Unexamined Patent Application Publication No. 2012-117905

PTL 4: Japanese Unexamined Patent Application Publication No. 2006-197202

SUMMARY OF INVENTION

Technical Problem

However, the technologies disclosed in aforementioned PTLs 1 to 4 respectively have problems as described below.

First, in the case of the technology disclosed in aforementioned PTL 1, in order to securely grasp presence or absence of a managed object, a sufficiently significant change in an antenna operating characteristic of an RFID tag and also a significant change in electromagnetic field coupling conveying the change in the antenna operating characteristic to an RFID reader antenna are required. However, aforementioned PTL 1 merely describes such a condition as magnitude of a coupling coefficient that changes depending on a distance, and the like, and does not clearly state what type of tag antenna is desired, and whether electric-field coupling a main coupling component of which is an electric field or magnetic-field coupling a main coupling component of which is a magnetic field needs to be used as electromagnetic field coupling. That is to say, there is a problem that an essential structural condition for securely grasping presence or absence of a managed object is not described. Further, there is also a problem in the technology disclosed in aforementioned PTL 1 that, even when presence or absence of a managed object in an area where an RFID tag including an ID indicating a specific managed object placement area is placed can be managed, in other words, even when a location where a certain managed object exists can be identified, what the managed object is cannot be identified.

Further, the technologies respectively disclosed in aforementioned PTLs 2 to 4 are technologies of managing presence or absence of a managed object in a broad area of within a range in which tag information of an RFID tag can be read from an RFID reader antenna, while identifying the managed object. In other words, the technologies respectively disclosed in aforementioned PTLs 2 to 4 have a problem that, although a managed object may be identified, a detailed location of the managed object in the broad area cannot be identified. Alternatively, when there is no obstacle between a tag and a reader antenna, a location of the managed object may only be narrowed down to a range of several meters being several tens of times a length of a tag size, based on a reflected signal strength from the tag.

OBJECT OF PRESENT INVENTION

The present invention is made in order to solve the problems as described above, and an object thereof is to provide a UHF band RFID system and a UHF band RFID tag detection method that are able to securely grasp presence or absence of a managed object, and, moreover, securely identify both an object type and a location of the managed object.

Solution to Problem

In order to solve the aforementioned problems, a UHF band RFID system and a UHF band RFID tag detection method, according to the present invention, mainly employ characteristic configurations as follows.

(1) The UHF band RFID system according to the present invention includes a reader antenna that is composed of a matched-terminated open-type transmission line and is connected to an ultra-high frequency (UHF) band radio frequency identification (RFID) reader, and a first-type RFID tag installed, without being fixed to a managed object, in a managed object placement area in which the managed object is placed, and a position of the managed object placed in the managed object placement area is a position where the reader antenna and an antenna of the first-type RFID tag are electric field coupled.

(2) The UHF band RFID tag detection method according to the present invention includes using a reader antenna that is composed of a matched-terminated open-type transmission line and is connected to an ultra-high frequency (UHF) band radio frequency identification (RFID) reader, and a first-type RFID tag installed, without being fixed to a managed object, in a managed object placement area in which the managed object is placed, and making a position of the managed object placed in the managed object placement area to be a position where the reader antenna and an antenna of the first-type RFID tag are electric field coupled.

Advantageous Effects of Invention

The UHF band RFID system and the UHF band RFID tag detection method, according to the present invention, include a reader antenna that is composed of a matched-terminated open-type transmission line and is connected to a UHF band RFID reader, and a first-type RFID tag installed, without being fixed to a managed object, in a managed object placement area in which the managed object is placed, and a position of the managed object placed in the managed object placement area is a position where the reader antenna and an antenna of the first-type RFID tag are electric field coupled, and therefore are able to provide the following effects.

Specifically, by using an electric-field antenna electric field coupled with the reader antenna as an antenna of the first-type RFID tag, in such a way that the reader antenna and an antenna of the first-type RFID tag are electric field coupled, influence of a relative dielectric constant and an electric conductivity of a managed object increases. Accordingly, presence or absence of a managed object placed in the managed object placement area can be securely grasped.

Furthermore, by including a second-type RFID tag fixed to the managed object, placing the managed object in a position where an antenna of the second-type RFID tag is magnetic field coupled with the reader antenna when placing the managed object in the managed object placement area, and using a magnetic-field antenna magnetic field coupled with the reader antenna, as an antenna of the second-type RFID tag, influence of a relative dielectric constant and an electric conductivity of a managed object can be decreased. Accordingly, a managed object placed in the managed object placement area can be securely identified, and both identification information of the managed object (i.e. identification information about an object type) and location information of the managed object (i.e. identification information about a location) can be securely identified.

That is to say, for example, the UHF band RFID system and the UHF band RFID tag detection method, according to the present invention, are able to detect presence or absence of a managed object at a specific location, based on a reflected signal strength change of the first-type RFID tag, and, on the other hand, are able to perform identification of a managed object by capturing a reflected signal of the second-type RFID tag. For example, by performing such two operations at the same time within a time interval in which the operations may be distinguished from another operation, location information of a managed object detected by using the first-type RFID tag can be coupled with identification information of the managed object detected by using the second-type RFID tag.

Subsequently, as long as there is no signal strength change in a reflected signal strength of the first-type RFID tag that reaches a level affecting presence or absence of a managed object, and also a state that there is no change in presence or absence of an identification signal or an identification signal strength of the second-type RFID tag continues, both an object type and a location of the managed object can be identified by retaining information identifying the object type and the location of the managed object.

BRIEF DESCRIPTION OF DRAWINGS

FIG. 5 is a table illustrating an example of dependence on a distance normalized by wavelength, with respect to respective relative strengths of a quasi-electrostatic field, an induction electric field, and a radiation electric field in an electric field given by equation (1).

DESCRIPTION OF EMBODIMENTS

Figure 1:
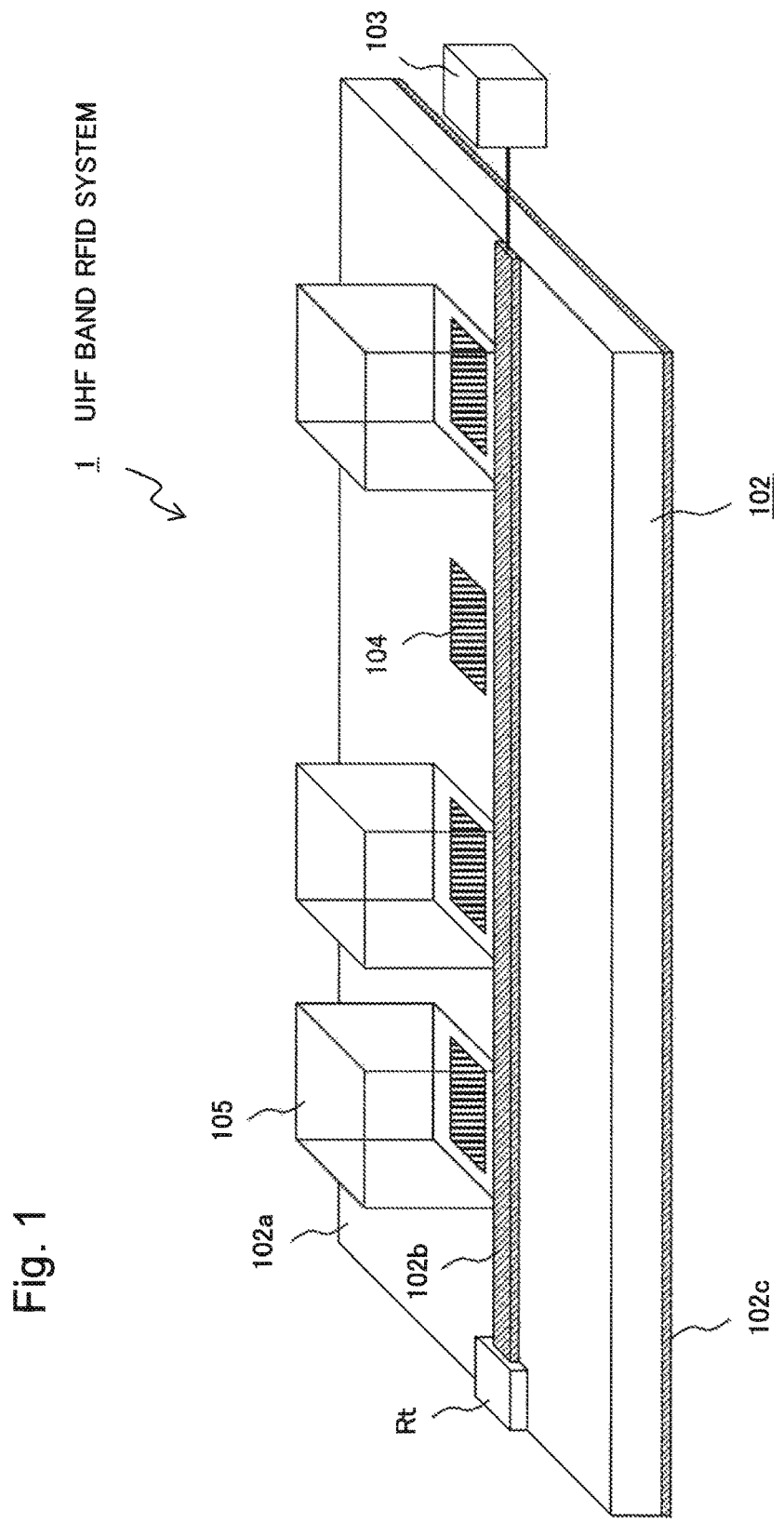
FIG. 1 is a perspective view illustrating an example of a schematic configuration of a UHF band RFID system according to a first example embodiment of the present invention.

Referring to attached drawings, preferred example embodiments of a UHF band RFID system and a UHF band RFID tag detection method, according to the present invention, will be described below. It is needless to say that reference signs given to the respective drawings below are given to respective components for convenience, as examples for facilitating understanding, and are not intended to limit the present invention to the illustrated modes.

Features of Present Invention

Prior to description of the example embodiments of the present invention, an overview of features of the present invention will be first described. An ultra-high frequency (UHF) band radio frequency identification (RFID) system according to the present invention has been obtained by repeated electromagnetic field simulations and experiments. It is a main feature of the UHF band RFID system that the system includes a reader antenna that is composed of a matched-terminated open-type transmission line and is connected to a UHF band RFID reader, and a first-type RFID tag installed, without being fixed to a managed object, in a managed object placement area in which the managed object is placed, and a position of the managed object placed in the managed object placement area is a position where the reader antenna and an antenna in the first-type RFID tag are electric field coupled. Thus, presence or absence of the managed object can be securely grasped.

Furthermore, it is also a main feature of the UHF band RFID system that the system further includes a second-type RFID tag fixed to the managed object, and, when the managed object is placed in the managed object placement area, the managed object is placed in a position where an antenna of the second-type RFID tag is magnetic field coupled with the reader antenna. Thus, both identification information about an object type of a managed object and location information about the managed object can be identified.

It is also a feature of the present invention that an antenna of the first-type RFID tag is an electric-field antenna and is placed in a position where the antenna is electric field coupled with the reader antenna, as electromagnetic field coupling with the reader antenna. Further, it is also a feature of the present invention that an antenna of the second-type RFID tag is a magnetic-field antenna and is placed in a position where the antenna is magnetic field coupled with the reader antenna, as electromagnetic field coupling with the reader antenna. Additionally, it is also a feature of the present invention that a plurality of the second-type RFID tags are fixed to the managed object.

That is to say, by using an electric-field antenna as an antenna of the first-type RFID tag and placing the antenna in a position where the antenna is electric field coupled with the reader antenna, a UHF band RFID system capable of securely grasping presence or absence of a managed object can be provided. Note that the electric-field antenna is an antenna mainly reacting to an electric field in space. For example, the electric-field antenna refers to a dipole antenna, a monopole antenna, or a group of antennas based on the aforementioned dipole antenna and monopole antenna, being modified for downsizing and the like.

On the other hand, the magnetic-field antenna used as an antenna of the second-type RFID tag is an antenna mainly reacting to a magnetic field in space. For example, the magnetic-field antenna refers to a micro loop antenna, a slot antenna, or a group of antennas based on the micro loop antenna and the slot antenna, being modified for downsizing and the like.

Further, the electric-field coupling refers to coupling a main coupling component of which is composed of a capacitance component in electromagnetic field coupling. On the other hand, the magnetic-field coupling refers to coupling a main coupling component of which is composed of an induction component in electromagnetic field coupling. A coupling coefficient of the electric-field coupling and a coupling coefficient of the magnetic-field coupling have opposite signs, and a final coupling coefficient is expressed by a sum of the coupling coefficient of the electric-field coupling and the coupling coefficient of the magnetic-field coupling. Accordingly, the aforementioned main component of coupling is defined to be electric-field coupling when a sign of the final coupling coefficient is the same sign as coupling a coupling component of which is composed of only a capacitance component, and is defined to be magnetic-field coupling when the sign of the final coupling coefficient is the same sign as coupling a coupling component of which is composed of only an induction component.

While common substances take various values in terms of a relative dielectric constant and an electric conductivity, only a few substances other than a magnetic body have a relative permeability that greatly differs from "1." Accordingly, it is a main requirement with respect to a managed object being a target of the present invention that presence or absence of the managed object is detected based on a difference in a relative dielectric constant and an electric conductivity. In order to more securely detect presence or absence of the managed object by using the first-type RFID tag storing identification data for identifying an installed position, it is desirable that presence or absence of the managed object greatly change an operating characteristic of a tag antenna of the first-type RFID tag and greatly change coupling between the tag antenna and the reader antenna. Consequently, presence or absence of the managed object greatly changes a strength of a reflected signal from the first-type RFID tag, and presence or absence of the managed object can be more securely grasped.

Antennas that are likely to be influenced by a relative dielectric constant and an electric conductivity of the managed object include an electric-field antenna, and, similarly, electromagnetic field coupling that is likely to be influenced includes electric-field coupling. Accordingly, the aforementioned configuration is able to provide a UHF band RFID system capable of securely grasping presence or absence of the managed object.

Further, a magnetic-field antenna is used as an antenna of the second-type RFID tag and is placed in a position where the antenna is magnetic field coupled with the reader antenna. Consequently, a UHF band RFID system capable of identifying both an object type and a location of a managed object, that is, both identification information about a managed object and placement location information about the managed object, can be provided. The second-type RFID tag stores identification information for identifying the managed object. The managed object exists close to the fixed second-type RFID tag. Consequently, it is required that an RFID reader connected to the reader antenna stably read identification information of the second-type RFID tag, with a less likelihood of being influenced by a relative dielectric constant and an electric conductivity of the managed object.

Antennas that are less likely to be influenced by a relative dielectric constant and an electric conductivity of the managed object include a magnetic-field antenna, and, similarly, electromagnetic field coupling that is less likely to be influenced includes magnetic-field coupling. Accordingly, it is desirable that the aforementioned configuration be taken with respect to the second-type RFID tag identifying the managed object.

By employing the configuration described above, for example, presence or absence of a managed object existing at a specific location can be detected based on a reflected signal strength change of the first-type RFID tag. On the other hand, the managed object can be identified by grasping a change in a reflected signal of the second-type RFID tag, that is, a change from detection to non-detection of the reflected signal, or from non-detection to detection. For example, by performing such two operations at the same time within a time interval in which the operations may be distinguished from another operation, location information about the managed object detected by the first-type RFID tag and identification information about the managed object detected by the second-type RFID tag can be matched (coupled). Subsequently, as long as there is no signal strength change in a reflected signal strength of the first-type RFID tag at a level affecting presence or absence of the managed object, and also there is no change in presence or absence of an identification signal of the second-type RFID tag or a signal strength change of the identification signal, information identifying both an object type and a location of the managed object continues to be retained. By such an operation, a UHF band RFID system capable of identifying both an object type and a location of the managed object can be provided.

First Example Embodiment

Next, referring to drawings, a first example embodiment of the present invention will be described in detail. First, FIG. 1 illustrates an example of a schematic configuration of a UHF band RFID system according to the first example embodiment of the present invention. As illustrated in the perspective view in FIG. 1, the UHF band RFID system 1 according to the first example embodiment of the present invention includes a reader antenna 102, a UHF band RFID reader 103, a first-type passive UHF band RFID tag 104 (hereinafter referred to as a first-type RFID tag 104), and a managed object 105 placed in a managed object placement area.

For example, the reader antenna 102 is a traveling-wave near-field antenna composed of a microstrip line being a type of an open-type transmission line composed of a dielectric plate 102a, a strip conductor 102b composed of a metallic plate, and a grounding conductor 102c, and a matched termination resistor Rt. The open-type transmission line used in such a reader antenna 102 is not limited to the microstrip line, and a transmission line that generates a near-electromagnetic field distribution mainly composed of a quasi-static electromagnetic field and an induction electromagnetic field around the transmission line, such as a coplanar line, a slot line, and a balanced-two-wire transmission line may be used. On the other hand, a coaxial cable and a waveguide each of which is a transmission line around which is shielded are shield-type transmission lines not generating such a near-electromagnetic field distribution around the transmission line, and therefore cannot be used as the reader antenna 102.

The first-type RFID tag 104 is placed on a surface on which a managed object 105 of the reader antenna 102 is placed (the surface hereinafter referred to as a front surface). The UHF band RFID reader 103 transmits a transmission signal to the reader antenna 102 and receives a response signal output by a tag antenna of the first-type RFID tag 104 through the reader antenna 102. More specifically, the UHF band RFID reader 103 is connected to one end of the reader antenna 102 (one end of the strip conductor 102b). A distributor, an RF switch, an impedance convertor, and the like may be inserted as appropriate between the reader antenna 102 and the UHF band RFID reader 103.

By transmitting a generated transmission signal to the reader antenna 102, the UHF band RFID reader 103 conveys the transmission signal to the tag antenna of the first-type RFID tag 104 electric field coupled with the reader antenna 102. On the other hand, the UHF band RFID reader 103 receives a response signal generated in the first-type RFID tag 104 conveyed to the reader antenna 102 by electric-field coupling. The other end of the reader antenna 102 (the other end of the strip conductor 102b) is connected to the matched termination resistor Rt.

One or more first-type RFID tags 104 are placed in positions where the tags are electric field coupled with the reader antenna 102. When receiving a signal inquiring about an ID (may be hereinafter also referred to as tag information) from the reader antenna 102, a passive first-type RFID tag 104 generates electric power for operation of an own chip from part of the signal obtained through a tag antenna, by using a power supply circuit (not illustrated in FIG. 1) in the chip. Further, the first-type RFID tag 104 decodes part of the received signal and generates received data. Then, the first-type RFID tag 104 checks tag information stored in a storage circuit in the chip against the received data, and, when the tag information and the received data match, operates a modulation circuit (not illustrated in FIG. 1), generates a modulation signal, and transmits the modulation signal to the reader antenna 102 through the tag antenna.

A managed object 105 is placed in a position where the object is electric field coupled with a tag antenna of a first-type RFID tag 104, and is placed without being fixed to the first-type RFID tag 104. The position where a managed object 105 is placed is hereinafter referred to as a managed object placement area 110. It is desirable that the managed object 105 contain a material with a high dielectric constant such as water, or metal. More specifically, a sheaf of thick papers such as a book, a rice ball, bread, a prepared food packaged in plastic, a human body such as a hand and a foot, a shoe and the like, in addition to a drink in a plastic bottle, a canned drink, and a snack packaged in aluminum, may be assumed as a target article of the managed object 105.

The reason presence or absence of diverse articles such as a watery article can be detected originates in use of the UHF band RFID system 1 in FIG. 1. In a case of an RFID system used in a common 13.56 MHz frequency band or below exhibits an extremely weak reaction to water due to a thicker skin depth. Further, in a case of a frequency band used in such a common RFID system, electromagnetic induction is used in coupling between a reader antenna and a tag antenna.

However, while electromagnetic induction is coupling by a magnetic field, and therefore is sensitive to a change in a relative permeability associated with presence or absence of an article a relative permeability of which greatly differs from "1," electromagnetic induction is not sensitive to difference in a relative dielectric constant. Accordingly, even when a relative dielectric constant of water takes an extremely high value of "80," a relative permeability takes a value in the neighborhood of "1," and therefore electromagnetic induction is not able to provide a sensitive reaction to water as an operation of the tag antenna. Further, in general, many of substances being target articles of a managed object 105 take relative permeability values in the neighborhood of "1" except for a magnetic material, whereas relative dielectric constants greatly differ from "1."

Further, in the case of the UHF band RFID system 1 according to the first example embodiment, accompanying a high frequency band for use, a data rate may also be set higher than that in a common RFID system using electromagnetic induction. In the case of the UHF band RFID system 1 according to the first example embodiment, the first-type RFID tag 104 may be covered by a plastic plate or the like. Further, in the present invention, bearing widely spread RFID systems in mind, an RFID system in the UHF band that provides effects of the present invention is selected out of the systems. However, as described above, when an RFID system is standardized and becomes widespread in a frequency band beyond the UHF band in the future, it is needless to say that the present invention may be applied to an RFID system based on the standard, as a matter of course. For example, it is needless to say that a similar configuration, function, and effect can be obtained in a 2.4 GHz band, a 5.8 GHz band, and the like as a frequency band beyond the UHF band. A small amount of water such as condensation may adhere to a front surface of a first-type RFID tag 104. In such a case, influence of the small amount of water may be eliminated by adjusting a coupling coefficient between the tag antenna and the managed object 105, and the like, or adjusting a threshold value used in determination of presence or absence of the managed object 105, that is, a threshold value of a signal strength received by the UHF band RFID reader 103.

Next, an operation of the UHF band RFID system 1 according to the first example embodiment will be described. The UHF band RFID system 1 detects presence or absence of a managed object 105, based on tag information and a signal strength of a first-type RFID tag 104. On performing a detection operation of presence or absence of a managed object 105, the UHF band RFID system 1 first transmits a tag information read command as a transmission signal from the UHF band RFID reader 103 through the reader antenna 102.

Next, a first-type RFID tag 104 receives, by a tag antenna, the transmission signal transmitted through the reader antenna 102. Then, the first-type RFID tag 104 generates electric power by using part of the received transmission signal, and starts the operation. Subsequently, the first-type RFID tag 104 decodes the received transmission signal and reproduces received data included in the received transmission signal. The first-type RFID tag 104 checks the received data against tag information included in a built-in storage circuit and, when the tag information and the received data match, generates a response signal including the tag information, modulates the response signal, and transmits the modulated signal to the reader antenna 102.

When receiving from the first-type RFID tag 104 the response signal related to the transmitted tag information read command, the UHF band RFID reader 103 determines whether a strength of the response signal is greater or less than a predetermined threshold value, and determines presence or absence of a managed object 105, based on the determination result. More specifically, the UHF band RFID reader 103 determines that a managed object 105 does not exist when the signal strength of the response signal from the first-type RFID tag 104 is greater than or equal to the threshold value, and determines that a managed object 105 exists when the signal strength of the response signal from the first-type RFID tag 104 is less than the threshold value.

The case of the signal strength of the response signal from the first-type RFID tag 104 being less than the threshold value includes a case that the response signal cannot be received due to the signal strength of the response signal being less than a lower reception limit of the UHF band RFID reader 103, and a case that the first-type RFID tag 104 cannot respond to a transmission signal due to a received signal strength of the transmission signal in the first-type RFID tag 104 receiving the transmission signal transmitted from the UHF band RFID reader 103 being less than a lower operating limit of the first-type RFID tag 104.

For example, in the example illustrated in FIG. 1, a managed object 105 does not exist on a first-type RFID tag 104 placed second from the right in the drawing, and therefore the first-type RFID tag 104 is able to transmit a response signal at a high signal strength. Consequently, the UHF band RFID reader 103 is able to receive a strong response signal from the first-type RFID tag 104 along with tag information. The tag information is previously associated with a location of the first-type RFID tag 104. Accordingly, since a signal strength of the response signal received from the first-type RFID tag 104 placed second from the right in FIG. 1 is greater than or equal to the threshold value, the UHF band RFID reader 103 determines that a managed object 105 does not exist in a position of the first-type RFID tag 104.

On the other hand, managed objects 105 are placed on the other three first-type RFID tags 104 in the example illustrated in FIG. 1, and therefore a signal strength of a response signal transmitted by each of the other three first-type RFID tags 104 is less than the threshold value. Consequently, the UHF band RFID reader 103 determines that managed objects 105 exist in positions of the other three first-type RFID tags 104. Note that, when the response signals from the other three first-type RFID tags 104 cannot be received within a predetermined certain period, as described above, the UHF band RFID reader 103 determines that managed objects 105 exist in the positions of the other three first-type RFID tags 104 by assuming that signal strengths of the response signals are weak due to existence of managed objects 105.

When tag information of the other three first-type RFID tags 104 cannot be obtained within the certain period, since the UHF band RFID reader 103 previously grasps that the other three first-type RFID tags 104 exist on a front surface of the reader antenna 102, the UHF band RFID reader 103 is able to determine that managed objects 105 exist at locations indicated by the tag information of the first-type RFID tags 104 not responding within the certain period. The certain period is determined from a number of first-type RFID tags 104 placed on the front surface of the reader antenna 102 and a tag reading speed of the UHF band RFID reader 103, and it is desirable that the period be a time in which a necessary and sufficient number of first-type RFID tags 104 can be read.

Further, it may be assumed that the UHF band RFID reader 103 is connected to a computer or functions as part of a computer, and determination of presence or absence of a managed object 105 is performed by the computer.

In order to more securely determine presence or absence of a managed object 105, it is important to make a greater change in a signal strength of a response signal from a first-type RFID tag 104, the change being based on presence or absence of the managed object 105. As described above, a managed object 105 is generally composed of materials with different relative dielectric constants and electric conductivities. A type of tag antenna of the first-type RFID tag 104 that may greatly change an operation of the tag antenna, based on presence or absence of a managed object 105 composed of such materials, is an electric-field antenna. That is to say, it is desirable that the tag antenna of the first-type RFID tag 104 be an electric-field antenna. Further, coupling between the reader antenna 102 and the tag antenna of the first-type RFID tag 104 greatly changes depending on presence or absence of a managed object 105 when a main coupling component between the reader antenna 102 and the tag antenna of the first-type RFID tag 104 is electric-field coupling. That is to say, it is desirable that the reader antenna 102 and the tag antenna of the first-type RFID tag 104 be electric field coupled.

A positional relation between a managed object 105, the first-type RFID tag 104, and the reader antenna 102 will be described more in detail below.

Figure 2:
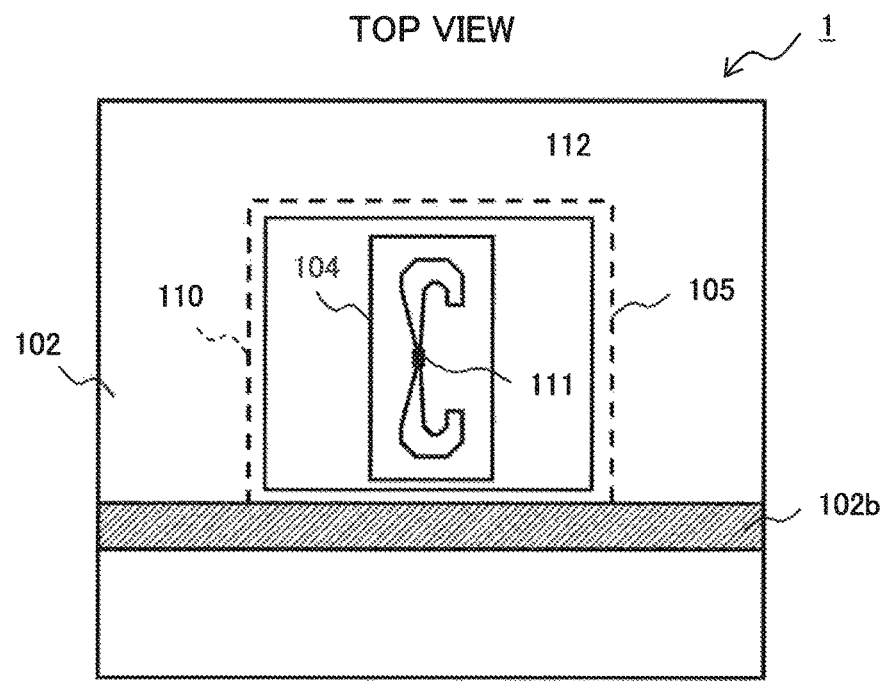
FIG. 2 is a top view illustrating an example of the UHF band RFID system according to the first example embodiment of the present invention viewed from the top.

First, FIG. 2 is a top view illustrating an example of the UHF band RFID system 1 according to the first example embodiment of the present invention viewed from the top, and illustrates a positional relation viewed from the top between a placement of a managed object 105, the first-type RFID tag 104, and the reader antenna 102 in the UHF band RFID system 1. The top view in FIG. 2 is an enlarged view of a managed object placement area 110 in which one managed object 105 is placed on one first-type RFID tag 104.

As illustrated in the top view in FIG. 2, the reader antenna 102 is formed in the UHF band RFID system 1, and the first-type RFID tag 104 is installed in a position in proximity to the strip conductor 102b on a front surface side of the reader antenna 102. Additionally, the managed object placement area 110 is set in a position covering the first-type RFID tag 104 in part or in whole, as an area in which the managed object 105 is placed. When a sufficiently large change in a signal strength of a response signal of the first-type RFID tag 104 can be obtained based on presence or absence of the managed object 105, the managed object placement area 110 does not necessarily need to cover the entire first-type RFID tag 104. As illustrated in FIG. 2, the first-type RFID tag 104 includes an RFID chip 111 and a tag antenna 112.

Figure 3:
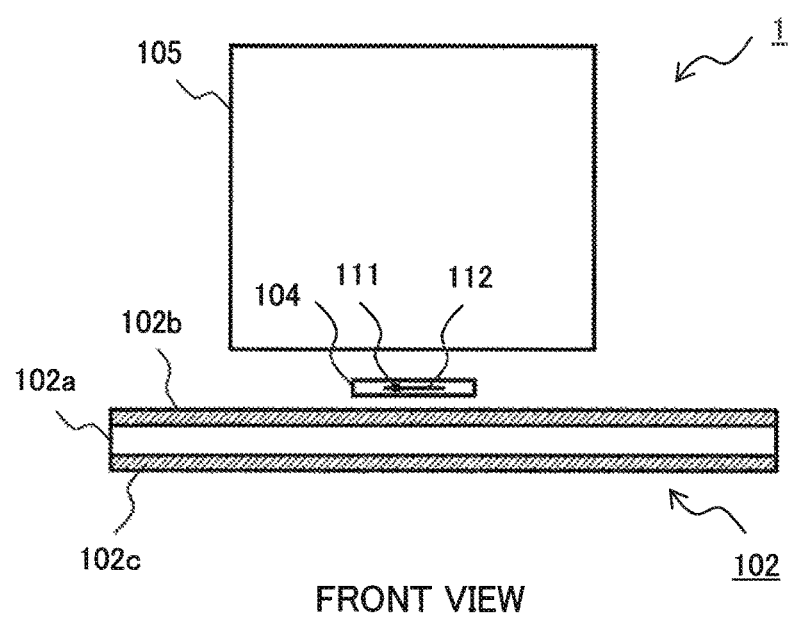
FIG. 3 is a front view illustrating an example of the UHF band RFID system according to the first example embodiment of the present invention viewed from the front.

Next, FIG. 3 is a front view illustrating an example of the UHF band RFID system 1 according to the first example embodiment of the present invention viewed from the front, and illustrates a positional relation viewed from the front between a placement of a managed object 105, a first-type RFID tag 104, and the reader antenna 102 in the UHF band RFID system 1. Similarly to the top view in FIG. 2, the front view in FIG. 3 is an enlarged view illustrating a managed object placement area 110 in which one managed object 105 is placed on one first-type RFID tag.

As illustrated in the front view in FIG. 3, the strip conductor 102b is provided on the front surface side of the reader antenna 102 (i.e. a front surface side of the dielectric plate 102a) in the UHF band RFID system 1, and the grounding conductor 102c is provided on a back surface side of the reader antenna 102 (i.e. a back surface side of the dielectric plate 102a). Then, as illustrated in FIG. 1, one end of the strip conductor 102b is connected to the grounding conductor 102c through the matched termination resistor Rt (not illustrated in FIG. 3). The reader antenna 102 is matched-terminated by such connection. As illustrated in FIG. 1, the other end of the reader antenna 102 is connected to the UHF band RFID reader 103.

Further, as illustrated in the front view in FIG. 3, the managed object 105 and the first-type RFID tag 104 are separated as illustrated, and the first-type RFID tag 104 is not fixed to the managed object 105 by affixment or the like. On the other hand, while the first-type RFID tag 104 is placed on the front surface of the reader antenna 102, the first-type RFID tag 104 may or may not be fixed to the front surface of the reader antenna 102. When the first-type RFID tag 104 is fixed to the front surface of the reader antenna 102, coupling between the reader antenna 102 and the tag antenna 112 of the first-type RFID tag 104 can be stably retained. On the other hand, when the first-type RFID tag 104 is not fixed to the front surface of the reader antenna 102, the placement of the managed object placement area 110 can be readily modified by changing the position of the first-type RFID tag 104 as appropriate. As illustrated in FIG. 3, the first-type RFID tag 104 includes an RFID chip 111 and a tag antenna 112.

Figure 4:
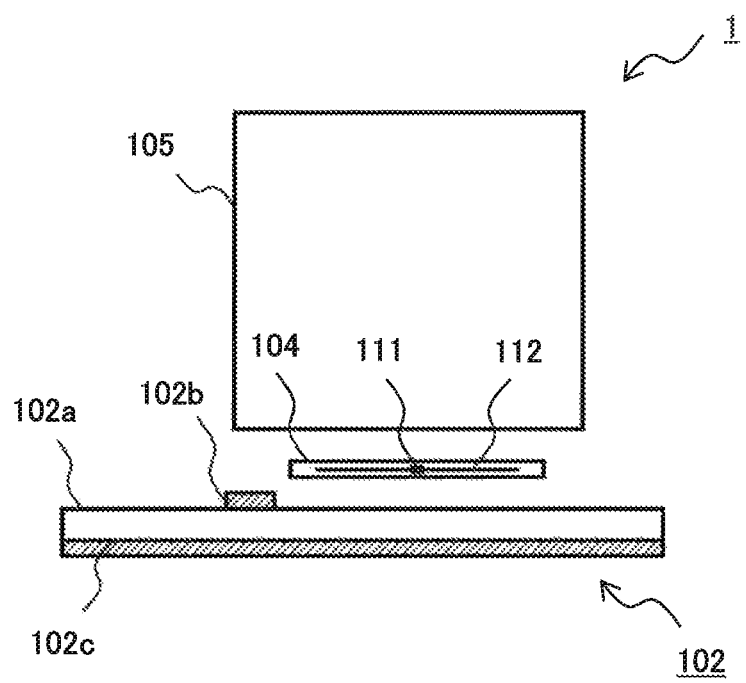
FIG. 4 is a side view illustrating an example of the UHF band RFID system according to the first example embodiment of the present invention viewed from the side.

Next, FIG. 4 is a side view illustrating an example of the UHF band RFID system 1 according to the first example embodiment of the present invention viewed from the side, and illustrates a positional relation viewed from the side between a placement of a managed object 105, a first-type RFID tag 104, and the reader antenna 102 in the UHF band RFID system 1. Similarly to the top view in FIG. 2, the side view in FIG. 4 is an enlarged view illustrating a managed object placement area 110 in which one managed object 105 is placed on one first-type RFID tag 104.

As illustrated in the side view in FIG. 4, a managed object 105 is placed in the managed object placement area 110 set above the first-type RFID tag 104 in the UHF band RFID system 1 according to the first example embodiment, and the reader antenna 102 is installed below the first-type RFID tag 104. The first-type RFID tag 104 includes an RFID chip 111 and a tag antenna 112.

Referring to FIGS. 2 to 4, effects provided by relations between the respective components in the UHF band RFID system 1 will be described more in detail.

First, as illustrated by the front view in FIG. 3 and the side view in FIG. 4, the managed object 105 is placed above the tag antenna 112 of the first-type RFID tag 104 in the UHF band RFID system 1. Additionally, the reader antenna 102 connected to the UHF band RFID reader 103 is placed below the first-type RFID tag 104. Thus, the managed object 105 is placed outside an area sandwiched by the reader antenna 102 and the first-type RFID tag 104 in the UHF band RFID system 1. Accordingly, a line of sigh between the reader antenna 102 and the first-type RFID tag 104 is not blocked by the managed object 105.

A difference between the UHF band RFID system 1 according to the first example embodiment and the technology described in aforementioned PTL 1 is placement of the strip conductor 102b and the tag antenna 112. As illustrated in the top view in FIG. 2 as an example, the tag antenna 112 according to the first example embodiment is formed as a type of electric-field antenna based on a dipole antenna. The tag antenna 112A is downsized compared with a common dipole antenna by narrowing a center part to increase inductance and thickening both ends to increase capacitance. Further, the tag antenna 112 is downsized by bending both ends.

As described above, the tag antenna 112 is a type of electric-field antenna obtained by downsizing a dipole antenna, and a direction more sensitive to an electric field is mainly a longitudinal direction of the rectangle-shaped first-type RFID tag 104 (a vertical direction in the top view in FIG. 2). Further, as illustrated in the side view in FIG. 4, the longitudinal direction of the rectangle-shaped first-type RFID tag 104 and a longitudinal direction of the strip conductor 102b in the reader antenna 102 are placed in such a way to be orthogonal to one another. Further, the tag antenna 112 is placed separately from a center of the strip conductor 102b. Such a placement enables the tag antenna 112 to sense an electric field passing from the strip conductor 102b toward the grounding conductor 102c at a high strength. In other words, the reader antenna 102 and the tag antenna 112 are mainly electric field coupled in the placement according to the first example embodiment.

Figure 6:
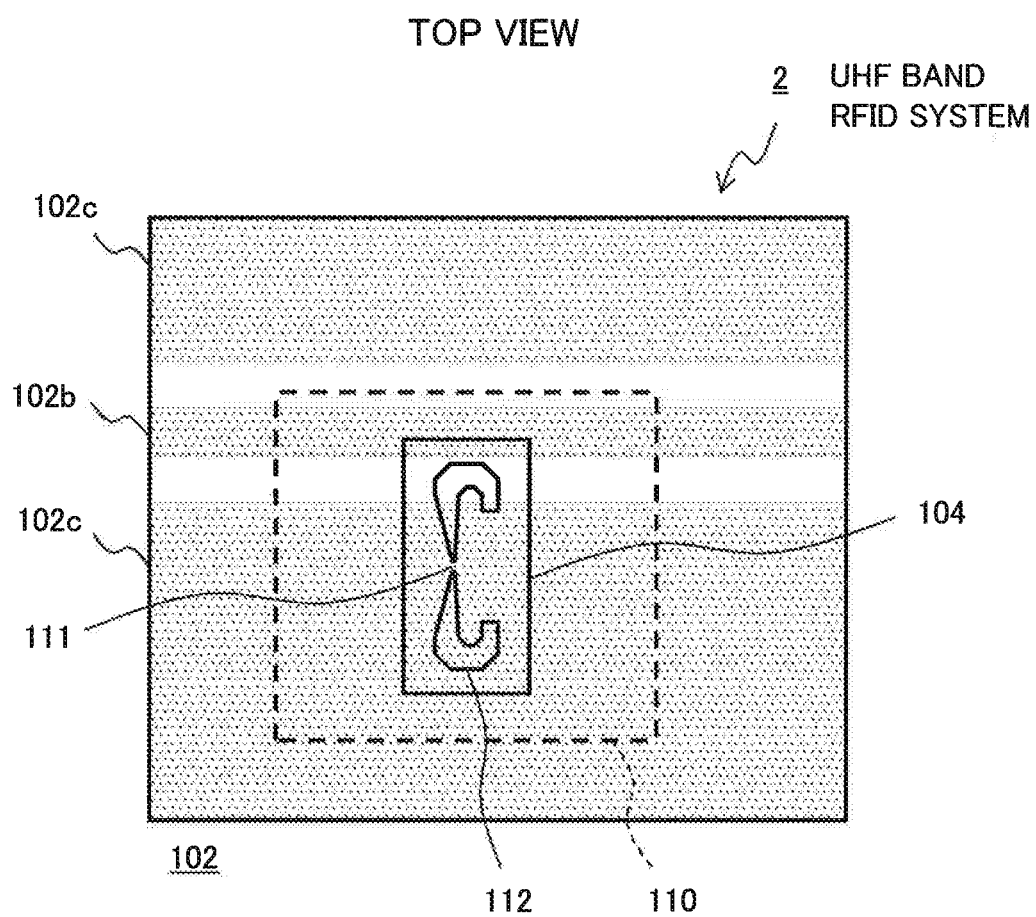
FIG. 6 is a top view illustrating an example of a UHF band RFID system according to a second example embodiment of the present invention viewed from the top.
Figure 9:
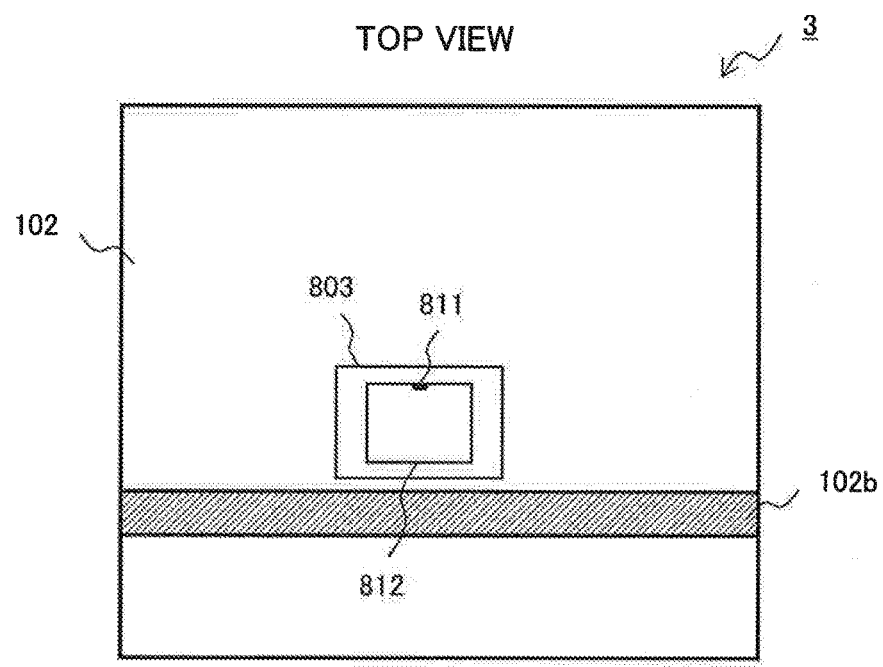
FIG. 9 is a top view illustrating an example of a positional relation between a second-type RFID tag and a reader antenna in the UHF band RFID system according to the third example embodiment of the present invention.
Figure 12:
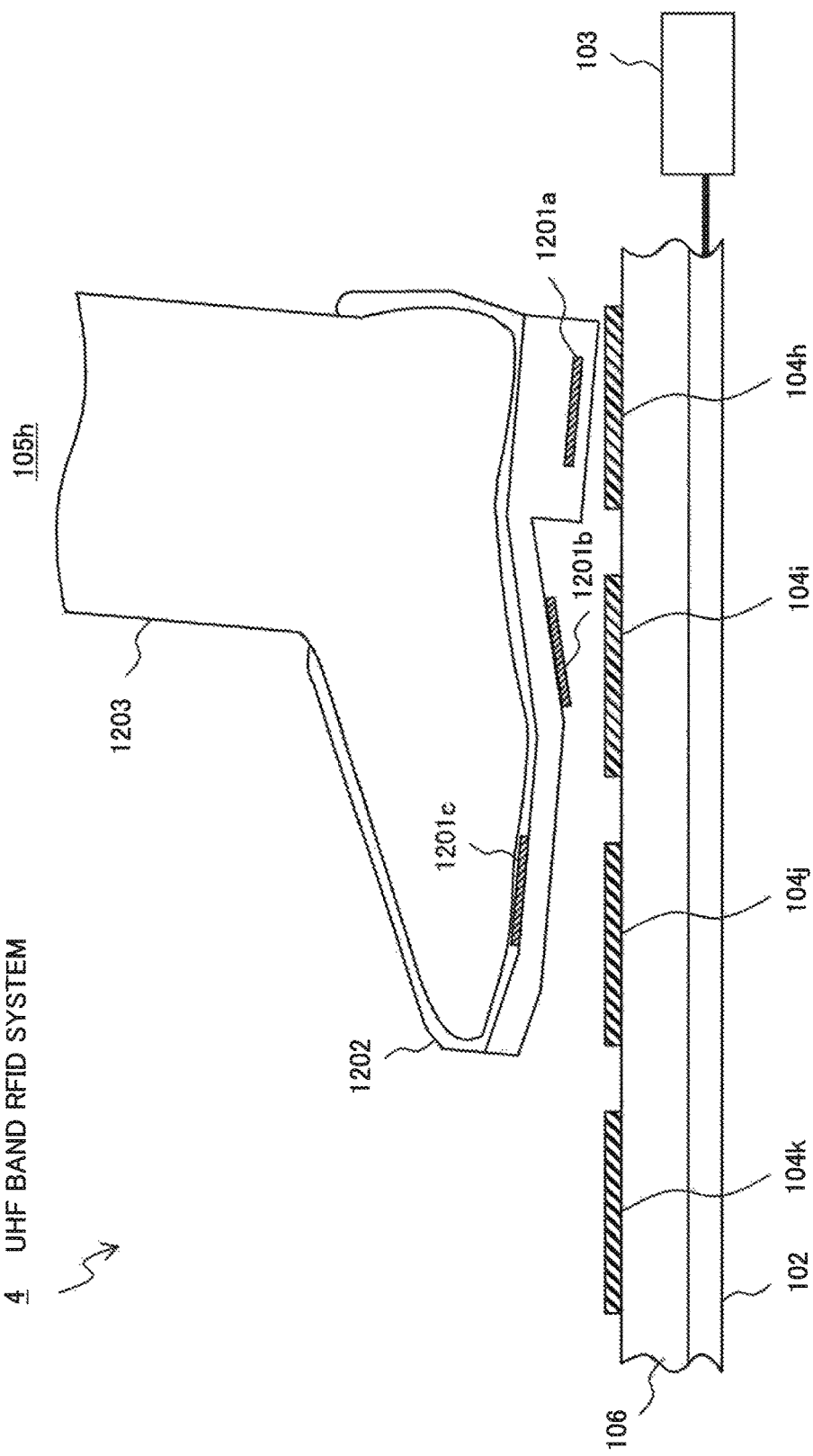
FIG. 12 is a cross-sectional view illustrating an example of a section of a UHF band RFID system according to a fourth example embodiment of the present invention.

On the other hand, placements illustrated in FIGS. 2 and 9 in aforementioned PTL 1 are placements in which a magnetic field generated by current passing through a strip conductor is received by a wiring in a longitudinal direction of a dipole-antenna-based tag antenna, and a main coupling component is obviously magnetic-field coupling. Further, as illustrated in FIG. 6 in aforementioned PTL 1, there is a situation that a tag antenna 112 is exposed to a very complicated electromagnetic field, and it is not clear whether a main coupling component is electric-field coupling or magnetic-field coupling. Additionally, while a case of a balanced-two-wire transmission line is illustrated in FIG. 12 in aforementioned PTL 1, it is not clear whether a main coupling component is magnetic-field coupling or electric-field coupling from a placement in a front view in FIG. 13 in aforementioned PTL 1.

In view of such circumstances, analytic examination of an electromagnetic field, electromagnetic field simulations, and experiments have been closely performed in the present invention, and it has been discovered in the UHF band RFID system 1 according to the first example embodiment that presence or absence of a managed object 105 can be securely grasped mainly by a placement in which the tag antenna 112 of the first-type RFID tag 104 is an electric-field antenna, and the reader antenna 102 and the tag antenna 112 are electric field coupled.

It is needless to say that the UHF band RFID system 1 according to the first example embodiment is different from a technology disclosed in U.S. Pat. No. 7,271,724 described in aforementioned PTL 1, in use of a near-field antenna and placement of system components. Specifically, in the UHF band RFID system 1 according to the first example embodiment, when a coupling coefficient between the managed object 105 and the tag antenna 112 is denoted as k2, and a coupling coefficient between the tag antenna 112 and the reader antenna 102 is denoted as k1, a signal strength between the tag antenna 112 and the reader antenna 102 is changed based on the coupling coefficient k2 that changes based on presence or absence of a managed object 105, and presence or absence of a managed object 105 is determined based on a change in the signal strength.

An effect of the UHF band RFID system 1 according to the first example embodiment based on a relation between such coupling coefficients k1 and k2, and setting of the coupling coefficients k1 and k2 will be described below. First, a coupling coefficient indicating a strength of electromagnetic field coupling may be evaluated relatively easily with an electromagnetic field simulator. Further, in description of electromagnetic field coupling, in general, when a wavelength of a radio signal between the tag antenna 112 and the reader antenna 102 is denoted as $\lambda$, a region a distance of which from a wave source (e.g. an antenna) is less than $\lambda/2\pi$ ($\pi$ denoting the circular constant) is referred to as a reactive near field, a region a distance of which from the wave source is greater than $\lambda/2\pi$ and less than the wavelength $\lambda$ is referred to as a radiative near field, and the two regions are collectively referred to as a near-field region.

In the near-field region, an electromagnetic field takes on a complicated aspect in which a quasi-static electromagnetic field, an induction electromagnetic field, and a radiation electromagnetic field exist each of which having a non-negligible strength ratio, and an electromagnetic field vector combining the fields variously changes spatially and temporally. Taking a case of a wave source being a micro dipole antenna as an example, an electric field E [V/m] and a magnetic field H [A/m] that are formed by the micro dipole antenna may be expressed in a spherical coordinate system $(r,\theta,\varphi)$ and a phasor expression by equations (1) to (4) below.

Math. 1

$$E_\theta = \frac{ql}{4\pi\varepsilon}\left\{\frac{1}{r^3} + \frac{1}{r^2} \cdot \frac{1}{(\lambda/2\pi)} \cdot e^{j\frac{z}{2}} + \frac{1}{r} \cdot \frac{1}{(\lambda/2\pi)^2} \cdot e^{jz}\right\} \cdot e^{-jkr} \cdot \sin\theta \quad (1)$$

Math. 2

$$E_r = \frac{ql}{2\pi\varepsilon}\left\{\frac{1}{r^3} + \frac{1}{r^2} \cdot \frac{1}{(\lambda/2\pi)} \cdot e^{j\frac{z}{2}}\right\} \cdot e^{-jkr} \cdot \cos\theta \quad (2)$$

Math. 3

$$H_\varphi = \frac{ql}{4\pi\sqrt{\varepsilon\mu}}\left\{\frac{1}{r^2} \cdot \frac{1}{(\lambda/2\pi)} \cdot e^{j\frac{z}{2}} + \frac{1}{r} \cdot \frac{1}{(\lambda/2\pi)} \cdot e^{jz}\right\} \cdot e^{-jkr} \cdot \sin\varphi \quad (3)$$

Math. 4

$$E_\varphi = H_\theta = H_r = 0 \quad (4)$$

In equations (1) to (4), an electric charge accumulated in the micro dipole antenna is denoted as q [C], an antenna length is denoted as 1 [m], a wavelength is denoted as $\lambda$ [m], and a distance between the wave source and an observation point is denoted as r [m]. Further, $\pi$ denotes the circular constant, $\varepsilon$ denotes a dielectric constant, and $\mu$ denotes a permeability. In equations (1) to (4), a term in proportion to $(1/r^3)$ represents a quasi-static electromagnetic field, a term in proportion to $(1/r^2)$ represents an induction electromagnetic field, and a term in proportion to $(1/r)$ represents a radiation electromagnetic field. The electromagnetic field components have different dependence on the distance r, respectively, and therefore relative strengths change depending on the distance r.

FIG. 5 is a table illustrating an example of dependence on a distance r normalized by a wavelength $\lambda$ with respect to respective relative strengths of a quasi-electrostatic field, an induction electric field, and a radiation electric field of an electric field $E_\theta$ given by equation (1). The first row of the table in FIG. 5 indicates a distance r normalized by a wavelength $\lambda$, and the second row indicates a distance converted based on a free-space wavelength at 950 MHz being nearly equivalent to an ultra-high frequency (UHF) band RFID frequency permitted by the Japanese Radio Law.

As can be understood from the table in FIG. 5, as the distance r increases, an electric field strength of each of the quasi-electrostatic field, the induction electric field, and the radiation electric field decreases, and, furthermore, a component ratio of each of the quasi-electrostatic field, the induction electric field, and the radiation electric field changes.

For example, in the reactive-near-field region in which a relation $(r<\lambda/2\pi)$ is satisfied, the respective electric field strengths of the quasi-electrostatic field, the induction electric field, and the radiation electric field become higher in this order, and in a region in which a relation $(r>\lambda/2\pi)$ is satisfied, the respective electric field strengths of the quasi-electrostatic field, the induction electric field, and the radiation electric field become lower in this order. Additionally, in a region in which a relation $(r>\lambda)$ is satisfied, contributions of the quasi-electrostatic field and the induction electric field become extremely small, and a far field region in which a relation (r>2λ) is satisfied is almost exclusively dominated by the radiation electric field component. On the other hand, in the near-field region in which a relation (r<λ) is satisfied, contributions of the quasi-electrostatic field and the induction electric field sufficiently remain, and in the reactive-near-field region in which the relation (r<λ/2π) is satisfied, contributions of the quasi-electrostatic field and the induction electric field are dominant. Further, as expressed in equations (1) to (4), compared with the radiation electric field, the quasi-static electromagnetic field and the induction electromagnetic field have an r-direction component and a φ-direction component in addition to a θ-direction component in the spherical coordinate system (r,θ,φ), thus having components in diverse directions.

In general, compared with the radiation electromagnetic field that is radiated into space from an antenna and propagates, the quasi-static electromagnetic field and the induction electromagnetic field that stay close to an antenna are dominant in the reactive-near-field region in which the relation (r<λ/2π) is satisfied, and also have high absolute electromagnetic field strengths. Further, in the radiative near field region in which a relation (λ/2π<r<λ) is satisfied, an absolute electromagnetic field strength generally becomes lower as the distance r from the wave source becomes longer. Additionally, in the radiative near field region in which the relation (λ/2π<r<λ) is satisfied, relative strengths of the quasi-static electromagnetic field and the induction electromagnetic field decrease as described above, and a relative strength of the radiation electromagnetic field increases. As described above, the quasi-static electromagnetic field and the induction electromagnetic field exist in the near-field region, and an electromagnetic field including the quasi-static electromagnetic field and the induction electromagnetic field generates coupling between the reader antenna 102 and the tag antenna 112, and coupling between the tag antenna 112 and a managed object 105.

In a case of common passive RFID systems using a UHF band and a microwave band, a distance r between the reader antenna 102 and the tag antenna 112 satisfies the relation (r>λ), and a radiation electromagnetic field is used for communication between the reader antenna 102 and the tag antenna 112. Consequently, in order to efficiently generate the radiation electromagnetic field, a resonant-type antenna typified by a patch antenna is used as the reader antenna 102. However, when such a resonant-type antenna is used in the near-field region in which the relation (r<λ) is satisfied, an electromagnetic field strength greatly changes by location due to a standing wave in the resonant-type antenna. For example, an amplitude becomes maximum around a peak of the standing wave, and the amplitude becomes "0" at a midpoint of the standing wave.

Accordingly, when a distance r between the reader antenna 102 using such a resonant-type antenna and the tag antenna 112 satisfies the relation (r<λ), in a part close to a midpoint of a standing wave in the reader antenna 102, the tag antenna 112 is not able to receive a signal from the reader antenna 102, or a received signal strength becomes extremely low. In other words, a blind area is generated and hinders use as an RFID system.

Under such circumstances, a system disclosed in U.S. Pat. No. 7,271,724 described in aforementioned PTL 1 inevitably takes a form in which a radio wave is irradiated from a reader antenna sufficiently smaller than a shelf, and a large coverage area is taken, by installing an RFID reader sufficiently apart from the shelf on which a managed object is placed, the managed object, and an RFID tag. Accordingly, the system described in aforementioned PTL 1 requires a large space between the RFID reader and the RFID tag.

Further, in the system described in aforementioned PTL 1, depending on a shelf material, particularly in a case of a shelf of a metallic material or the like, a multipath phenomenon may occur, and RFID tag reading may become unstable due to radio wave interference, hindering tag information reading. Further, when a human or an object exists between the reader antenna and a location where a managed object is placed, tag information cannot be read, similarly to the case that a managed object exists. Consequently, a problem that a managed object is erroneously detected despite absence thereof occurs.

On the other hand, in the near-field region in which the relation (r<λ) is satisfied and, desirably, the reactive-near-field region in which the relation (r<λ/2π) is satisfied, a coupling circuit may be formed by electromagnetic field coupling between the antennas of the RFID reader and the RFID tag through a quasi-static electromagnetic field and an induction electromagnetic field that exist in the regions. In a case of the near-field region, a large space is not required between the RFID reader and the RFID tag, as indicated in the condition. However, when a resonant-type antenna is simply used as the reader antenna 102, a blind area is generated and hinders use, as described above. Further, a typical size of a standing wave antenna is around a wavelength λ, and a coverage area becomes extremely small when the antenna is used in proximity to the RFID tag.

Accordingly, in the UHF band RFID system 1 according to the first example embodiment, the reader antenna 102 connected to the UHF band RFID reader 103 is composed of a matched-terminated open-type transmission line, and the first-type RFID tag 104 is placed in such a way that the open-type transmission line and the tag antenna 112 of the first-type RFID tag 104 are electric field coupled. Then, in the UHF band RFID system 1 according to the first example embodiment, by using an open-type transmission line radiating a less amount of radio wave, as the reader antenna 102 of the UHF band RFID reader 103, a coupling circuit is formed by electromagnetic-field coupling the reader antenna 102 and the tag antenna 112 through a quasi-static electromagnetic field and an induction electromagnetic field that are generated around the open-type transmission line in the near-field region in which the relation (r<λ) is satisfied and, desirably, the reactive-near-field region in which the relation (r<λ/2π) is satisfied. In other words, the open-type transmission line is used as a traveling-wave antenna operating in the near-field region.

Employing such a configuration in the UHF band RFID system 1 according to the first example embodiment eliminates the need for a large space between the reader antenna 102 and the first-type RFID tag 104. Further, communication between the reader antenna 102 and the tag antenna 112 is performed through the coupling circuit at a short distance, and therefore occurrence of a multipath phenomenon can be deterred, and erroneous detection caused by a human or an object existing between the reader antenna 102 and a location where a managed object 105 is placed can be suppressed. Additionally, a matched-terminated open-type transmission line is used as the reader antenna 102, and therefore a main component of an electromagnetic wave propagating through the reader antenna 102 propagates to the matched termination as a traveling wave without generating a standing wave. Note that, strictly speaking, "not generating a standing wave" means that a standing wave is very small, and normally means that a standing wave ratio takes a value less than or equal to "2," desirably less than or equal to "1.2."

When a termination of a transmission line is matched with sufficient precision, or when an electromagnetic wave propagating through the transmission line is sufficiently attenuated near the termination, a large standing wave is not generated in the transmission line, and a traveling wave is a main component. Then, by using an electromagnetic field distribution in such a transmission line, a traveling wave antenna can be formed. Additionally, a quasi-electromagnetic field formed in space around the transmission line contains a relatively small radiation electromagnetic field and contains a static electromagnetic field and an induction electromagnetic field as main components. That is to say, electromagnetic field strengths of the quasi-static electromagnetic field and the induction electromagnetic field are higher than a strength of the radiation electromagnetic field, and even when the UHF band RFID reader 103 operates at a same output, an electromagnetic field strength obtained by the first-type RFID tag 104 is higher. In other words, an environment in which unnecessary radiation of an electromagnetic field to surroundings is suppressed while guaranteeing operation of the first-type RFID tag 104 can be formed.

In a case of a commonly used standing-wave-type antenna such as a patch antenna, an electromagnetic field distribution close to the antenna is extremely non-uniform depending on a standing wave inside the antenna. Consequently, an area in which a managed object 105 can be managed is limited, in order to avoid a blind part. By contrast, in a case of a traveling-wave antenna composed of the open-type transmission line according to the first example embodiment, an unchanged part such as a node does not exist in an electromagnetic field distribution, even close to the antenna, and every part of the antenna is constantly changing. Accordingly, non-uniformity of an electromagnetic field accompanying a standing wave along the antenna is not generated even in the near-field region, and therefore an area in which tag information of the first-type RFID tag 104 cannot be read is not generated. Thus, a degree of freedom of placement of the reader antenna 102 and the tag antenna 112 can be improved.

Further, the UHF band RFID system 1 according to the first example embodiment performs communication through electromagnetic field coupling between the reader antenna 102 and the tag antenna 112 by using the aforementioned traveling wave as a signal. Consequently, unlike the case of the resonant-type antenna, a blind area is not generated, and use as an RFID system is not hindered. Accordingly, the UHF band RFID system 1 is able to take a large coverage area by extending the transmission line independently of a wavelength within a range of electromagnetic field strengths of a quasi-static electromagnetic field and an induction electromagnetic field generated around the open-type transmission line being sufficiently high for operating the first-type RFID tag 104. In other words, by using the aforementioned open-type transmission line, the UHF band RFID system 1 according to the first example embodiment suppresses a radiation loss of electric power and facilitates expansion of the coverage area.

The open-type transmission line mentioned herein basically refers to a transmission line aiming for suppressing radiation and transmitting an electromagnetic wave in a longitudinal direction of the line, the transmission line being an open-type. For example, a balanced-two-wire transmission line and a similar transmission line, transmission lines such as a micro strip line, a coplanar line, and a slot line, and variations thereof such as a grounded coplanar line and a triplate line may be listed as examples of the open-type transmission line.

Further, an antenna extending in a planar manner that conveys a signal by changing an electromagnetic field in an interspace region sandwiched by a mesh conductor part and a sheet conductor part, and a leak region outside the mesh conductor part may be used depending on a condition. Such an antenna extending in a planar manner in which a standing wave coexists also operates, though incompletely, as a traveling wave antenna, and may be used in a use environment in which non-uniformity of an electromagnetic field distribution generated by the standing wave can be neglected. On the other hand, shield-type transmission lines not generating an electromagnetic field such as a quasi-static electromagnetic field and an induction electromagnetic field around the transmission line, such as a coaxial cable or a waveguide, a circumference of the transmission line of which is shielded, cannot be used.

Further, there is an electromagnetic wave transmission sheet that generates an electromagnetic field in an interspace region sandwiched by two conductive sheet bodies facing one another, and causes the electromagnetic field to travel in a desired direction by changing the electromagnetic field by changing voltage between the two conductive sheet bodies, or changing voltage between the conductive sheet bodies by change in the electromagnetic field. Additionally, from a broader viewpoint, the electromagnetic wave transmission sheet may be viewed as a type of the open-type transmission line according to the first example embodiment when viewed in a longitudinal direction of the sheet. However, the electromagnetic wave transmission sheet is not necessarily considered optimum for implementation of the present invention due to a large standing wave caused by fluctuation of a transmission coefficient generated by the standing wave in the sheet.

Further, in the case of the electromagnetic wave transmission sheet, a top surface of a waveguide forms a metallic mesh sufficiently finer than a wavelength of a radio signal, and it may be viewed that an evanescent wave leaks out from the top surface. Such a transmission line provided with a plurality of slots from which electromagnetic fields leak out, an interval, a width, and a length of each of the slots generally being less than ($1/10$) of the wavelength of the radio signal, may be viewed as a type of the open-type transmission line in the UHF band RFID system 1 according to the first example embodiment.

On the other hand, the open-type transmission line in the UHF band RFID system 1 according to the first example embodiment differs from a so-called crank line antenna and a meander line antenna that obtain a certain radiation electromagnetic field strength by designing a crank shape aiming for radiation from an open-type transmission line or by actively using a higher mode, and a traveling wave antenna aiming for radiation in the far field by using a leaky coaxial cable or the like. In the crank line antenna, the meander line antenna, and the traveling wave antenna, radiation is preferentially generated from crank shapes and slots that are cyclically provided, each of which having a size of around a wavelength of a radio signal, typically ($1/10$) of the size of the wavelength of the radio signal or greater. Accordingly, an electromagnetic field strength greatly changes by location, similarly to the aforementioned resonant-type antenna. Accordingly, use in the near-field region may cause unstable reading of tag information of an RFID tag or failed reading of tag information, depending on a location, and thus use for a UHF band RFID system is hindered.

Furthermore, frequency allocation for a UHF band RFID system differs from one country to another, and is mostly distributed in a frequency bandwidth from 860 to 960 MHz. Such frequency bandwidth distribution represents a broad fractional bandwidth of approximately 10%, requiring significant modification in design of a resonance point of a resonant-type antenna and a cycle of a crank, a meander, or a slot, depending on a frequency allocated to each country. By contrast, the UHF band RFID system 1 according to the first example embodiment inherently uses an open-type transmission line with an extremely broad bandwidth, and therefore a same antenna may be used worldwide as the reader antenna 102, without particular modification.

Further, the UHF band RFID system 1 according to the first example embodiment provides a managed object placement area 110 in which a managed object 105 is placed separately from a first-type RFID tag 104 in such a way that the managed object 105 and the tag antenna 112 of the first-type RFID tag 104 are electric field coupled. Accordingly, when a managed object 105 exists in the managed object placement area 110, the managed object 105 and the tag antenna 112 form a coupling circuit. Consequently, a resonance frequency of the tag antenna 112 changes, and feeding point impedance of the tag antenna 112 changes, compared with a case that a managed object 105 does not exist in the managed object placement area 110.

The tag antenna 112 is developed to maximize receiving sensitivity by resonating at a frequency of a signal used for communication in free space and adjusting feeding point impedance. Accordingly, the aforementioned change decreases receiving sensitivity and further influences operation of the tag antenna 112 on transmission of a reflected signal to the UHF band RFID reader 103. Consequently, power receiving sensitivity to the signal used in the communication decreases. Further, a transmission output of a signal reflected by the first-type RFID tag 104 also decreases.

Accordingly, the first-type RFID tag 104 is not able to receive signal power from the UHF band RFID reader 103, is not able to secure operating power as an RFID tag due to a low received signal power strength, or is not able to generate a reflected electromagnetic field with a sufficient strength as an RFID tag. Consequently, the UHF band RFID reader 103 is not able to read tag information of the first-type RFID tag 104. Alternatively, a strength and a phase of a reflected electromagnetic field arriving at the UHF band RFID reader 103 greatly change with a resonance frequency change of the first-type RFID tag 104, and the like.

That is to say, when a managed object 105 exists in the managed object placement area 110, tag information of the first-type RFID tag 104 cannot be read, or a strength and a phase of a reflected electromagnetic field from the first-type RFID tag 104 greatly change, compared with a case that a managed object 105 exists. Consequently, the UHF band RFID reader 103 is able to securely detect presence of the managed object 105. In other words, as a result of change in an operating characteristic of the tag antenna 112 being generated based on presence or absence of a managed object 105, the UHF band RFID reader 103 is able to detect a change in a strength and a phase of the reflected signal from the first-type RFID tag 104, and is able to detect presence or absence of a managed object 105 from the detection result.

Thus, in the UHF band RFID system 1 according to the first example embodiment, detection of presence or absence of a managed object 105 does not necessarily require a line of sight between the first-type RFID tag 104 and the UHF band RFID reader 103 to be blocked by the managed object 105. Specifically, a location where the managed object 105 is placed has only to be provided as a managed object placement area 110 separately from the tag antenna 112 (or the first-type RFID tag 104) in such a way that the managed object 105 is electromagnetic field coupled with the tag antenna 112. Accordingly, a placement location of a managed article is not necessarily limited to a location between the UHF band RFID reader 103 and the first-type RFID tag 104, enabling free placement.

Further, the UHF band RFID system 1 according to the first example embodiment determines that an article is placed close to a power fed tag antenna 112 not simply by an operating characteristic change of the tag antenna 112 itself but makes the determination by a reading result of tag information at the UHF band RFID reader 103. Consequently, a degree of freedom of relative positioning of the reader antenna 102 and the first-type RFID tag 104 can be set high. Accordingly, by causing the first-type RFID tag 104 to lie in between, a degree of freedom of relative positioning of the reader antenna 102 and a location where a managed object 105 is placed can also be improved.

Furthermore, as described above, an electromagnetic field formed by the tag antenna 112 at a location where a managed object 105 is placed includes components of a quasi-static electromagnetic field and an induction electromagnetic field in addition to a radiation electromagnetic field. Accordingly, the electromagnetic field components extend in various directions compared with a normal far-field radiation electromagnetic field component. Consequently, the UHF band RFID system 1 according to the first example embodiment is able to improve a degree of freedom of relative positioning of a managed article, that is, the managed object 105 and the first-type RFID tag 104.

Further, the UHF band RFID system 1 according to the first example embodiment is based on a common RFID system, and therefore each first-type RFID tag 104 has a unique ID (tag information) and is able to perform multiple access, based on the tag information. Accordingly, by associating tag information of a first-type RFID tag 104 with a location where a managed object 105 is placed (i.e. identification information about a managed object placement area 110 in which the first-type RFID tag 104 is installed), a location where the managed object 105 exists can be identified by unread tag information of the first-type RFID tag 104.

On the other hand, when a managed object 105 does not exist, the first-type RFID tag 104 is able to respond to a signal from the UHF band RFID reader 103, and also the UHF band RFID reader 103 is able to read tag information of the first-type RFID tag 104. Accordingly, when a managed object 105 does not exist, the tag information of the first-type RFID tag 104 can be read even at a normal reflected electromagnetic field strength, and therefore absence of a managed object 105 can be securely detected. Additionally, a location where a managed object 105 does not exist can be identified by the read tag information of the first-type RFID tag 104. Further, when a plurality of managed objects 105 are managed, tag information associated with a location where a managed object 105 is placed is different from one another, and therefore a location where each managed object 105 exists can be identified, and article management can be performed.

Being able to detect presence or absence of a managed object 105 as described above, the UHF band RFID system 1 according to the first example embodiment is able to manage presence or absence of a managed object 105 without directly affixing a first-type RFID tag 104 to a managed article, that is, the managed object 105.

Further, when a wavelength of a signal used in communication between the UHF band RFID reader 103 and a first-type RFID tag 104 is denoted as λ, the UHF band RFID system 1 according to the first example embodiment provides a managed object placement area 110 in which a managed object 105 is placed in such a way that a first distance L1 between the managed object 105 and the tag antenna 112 satisfies a relation (L1≤λ). Further, the UHF band RFID system 1 according to the first example embodiment performs placement in such a way that a second distance L2 being a line-of-sight distance between the reader antenna 102 of the UHF band RFID reader 103 and the tag antenna 112 of the first-type RFID tag 104 satisfies a relation (L2≤λ). The distance in the UHF band RFID system 1 according to the first example embodiment refers to a distance in radio wave propagation and nearly matches a geometrical shortest distance.

As long as a distance between the managed object placement area 110 in which the managed object 105 is placed and the tag antenna 112 of the first-type RFID tag 104, that is, the first distance L1, satisfies the relation (L1≤λ), a location where an article, that is, the managed object 105, is placed is within a range of the near-field region viewed from the first-type RFID tag 104. Accordingly, even in a case that a managed object 105 contains a high-dielectric-constant material such as water, or metal in a region in which sufficient contributions of a quasi-electrostatic field and an induction electric field exist, the tag antenna 112 and the managed object 105 can be electromagnetic field coupled through the quasi-static electromagnetic field and the induction electromagnetic field, as long as the managed object 105 is placed in the managed object placement area 110. Note that a human body contains a large amount of water and can be detected as a managed object 105, and therefore the system can be used for flow line management of people, and the like.

By setting the first distance L1 to a value satisfying the relation (L1≤λ), components of the quasi-static electromagnetic field and the induction electromagnetic field exist at non-negligible strengths in the near-field region of the tag antenna 112, and electromagnetic field components of the quasi-static electromagnetic field and the induction electromagnetic field generate electromagnetic field coupling between the tag antenna 112 and the managed object 105, through mutual inductance, capacitance, and the like. Accordingly, based on presence or absence of the managed object 105, a circuit constant of the tag antenna 112 changes, and an operating characteristic of the tag antenna 112 changes.

Further, as a more readily understandable change based on presence or absence of the managed object 105, a phenomenon that a resonance frequency of a tag antenna 112 changes may be cited. When a commonly sold RFID tag is used as a first-type RFID tag 104 in order to suppress an RFID system cost, the tag antenna 112 is a standing wave antenna based on a dipole antenna. When a first-type RFID tag 104 including the standing wave antenna is used, higher sensitivity can be provided by setting a resonance frequency of the tag antenna 112 in tune with a frequency in wireless communication. Note that a state that resonance is generated at a frequency set as a resonance frequency of the tag antenna 112 corresponds to a state that a managed object 105 does not exist.

Further, when a managed object 105 is placed on a first-type RFID tag 104 set as a managed object placement area 110, the tag antenna 112 couples with the managed object 105, and therefore a resonance frequency generally decreases. Accordingly, receiving sensitivity of the tag antenna 112 at the wireless communication frequency greatly decreases. For example, when operating power of the RFID chip 111 cannot be provided due to decrease in receiving sensitivity, the first-type RFID tag 104 is not able to respond to an inquiry from the UHF band RFID reader 103. Alternatively, even when operating power can be provided, the tag antenna 112 is not able to generate a spatial electromagnetic field change at a sufficient strength by a modulation signal generated in the RFID chip 111.

Consequently, when the managed object 105 exists, the first-type RFID tag 104 no longer responds to an inquiry from the UHF band RFID reader 103, or a strength of a reflected electromagnetic field from the first-type RFID tag 104 greatly changes, compared with a case that the managed object 105 does not exist. By detecting such a strength change in the reflected electromagnetic field in the UHF band RFID reader 103, presence or absence of the managed object 105 can be determined. For example, such determination processing may be performed by a computer.

As described above, the UHF band RFID system 1 according to the first example embodiment is able to detect presence or absence of a managed object 105 and also manage presence or absence of the managed object 105, without affixing a first-type RFID tag 104 to the managed object 105.

Further, in order to generate a change in a response of a first-type RFID tag 104, based on presence or absence of a managed object 105, the UHF band RFID system 1 according to the first example embodiment has only to set a first distance L1 between the first-type RFID tag 104 and the managed object 105 to satisfy the relation (L1≤λ), and there is no need to block a line of sight between the first-type RFID tag 104 and the reader antenna 102 by the managed object 105. In other words, placement of the managed object 105 is not limited to between the reader antenna 102 of the UHF band RFID reader 103 and the first-type RFID tag 104, and a degree of freedom of placement can be improved. For example, when presence or absence of a commodity on a commodity display shelf is detected, the reader antenna 102 and the first-type RFID tag 104 may be incorporated into a shelf board, and a very excellent effect from a viewpoint of appearance of the commodity display shelf can also be obtained by a hidden state of the antennas.

While a scheme of determining presence or absence of a managed object 105 by detecting a signal strength change generated by deviation of a resonance frequency of a tag antenna 112 from a wireless communication frequency has been mainly described, the present invention is not limited thereto. For example, when the resonance frequency of the tag antenna 112 deviates from the wireless communication frequency, presence or absence of an article, that is, a managed object 105, may be determined by the UHF band RFID reader 103 sweeping the wireless communication frequency within a legally permitted range and detecting the deviation of the resonance frequency. Further, a phase greatly changes around the resonance frequency. Accordingly, it is needless to say that presence or absence of the article, that is, the managed object 105, can be determined by observing a phase change.

Further, similarly to the first distance L1 between a managed object 105 and a tag antenna 112, as long as a second distance L2 being a line-of-sight distance between the reader antenna 102 of the UHF band RFID reader 103 and a tag antenna 112 of a first-type RFID tag 104 satisfies the relation (L2≤λ), the reader antenna 102 and the tag antenna 112 are within a range of the near-field region. The second distance L2 being a line-of-sight distance refers to a distance between the strip conductor 102b being a particularly strong wave source in the reader antenna 102, and the tag antenna 112. By setting the line-of-sight distance L2 to a wavelength λ or less, sufficient contributions of a quasi-electrostatic field and an induction electric field are provided, and the reader antenna 102 and the tag antenna 112 can be electromagnetic field coupled.

When presence or absence of an article, that is, a managed object 105, is determined by a strength of a reflected electromagnetic field from a first-type RFID tag 104, as is the case with the UHF band RFID system 1 according to the first example embodiment, a change in the reflected electromagnetic field strength due to radio wave interference is generally likely to cause erroneous detection. However, in the UHF band RFID system 1 according to the first example embodiment, by configuring the second distance L2 being a line-of-sight distance between the reader antenna 102 and a tag antenna 112 to satisfy the relation (L2≤λ), wireless communication between the reader antenna 102 and the tag antenna 112 is mainly performed by a direct wave, making radio wave interference accompanying a multipath phenomenon less likely to occur. Accordingly, erroneous detection due to radio wave interference can be suppressed.

Further, when presence or absence of an article, that is, a managed object 105, is determined by a change in a strength and a phase of a reflected electromagnetic field from a first-type RFID tag 104 or a resonance frequency change of the tag antenna 112, as is the case with the UHF band RFID system 1 according to the first example embodiment, erroneous detection due to radio wave interference accompanying an ambient environment is generally likely to occur, as described above. However, in the UHF band RFID system 1 according to the first example embodiment, by configuring the second distance L2 being a line-of-sight distance between the reader antenna 102 and the tag antenna 112 to satisfy the relation (L2≤λ), wireless communication between the reader antenna 102 and the tag antenna 112 is mainly performed by a direct wave, as described above, making radio wave interference accompanying a multipath phenomenon reflecting the ambient environment less likely to occur. Accordingly, erroneous detection due to radio wave interference can be suppressed. In a particular case of managing presence or absence of a commodity on a commodity shelf, while the commodity shelf may often be made of metal or is a metallic refrigeration case, the UHF band RFID system 1 according to the first example embodiment can be stably operated even in such an environment.

Furthermore, in the UHF band RFID system 1 according to the first example embodiment, by configuring the second distance L2 being a line-of-sight distance between the reader antenna 102 and the tag antenna 112 to satisfy the relation (L2≤λ), the second distance L2 being a line-of-sight distance between the reader antenna 102 and the first-type RFID tag 104, that is, the tag antenna 112, becomes approximately 0.3 m or less in a case of a UHF band being one of RFID standard frequencies, as indicated in FIG. 5. Moreover, as described above, the first distance L1 between a managed object 105 and the first-type RFID tag 104, that is, the distance L1 between a managed object placement area 110 and the first-type RFID tag 104, also satisfies the relation (L1≤λ), and therefore L1 similarly becomes approximately 0.3 m or less in the case of the UHF band being one of the RFID standard frequencies.

Accordingly, an interval between the reader antenna 102 and the managed object placement area 110 narrows to an order of approximately 0.3 m or less. Consequently, in the UHF band RFID system 1 according to the first example embodiment, by narrowing an interval between a managed object 105 and a first-type RFID tag 104 or the reader antenna 102, an incident of an object or a person different from the managed object 105 entering the interval can be suppressed, and erroneous detection of presence or absence of the managed object 105 accompanying the incident can be suppressed.

Further, in the UHF band RFID system 1 according to the first example embodiment, when the circular constant is denoted as π, the first distance L1 between a managed object 105 and a first-type RFID tag 104 may be set to satisfy a relation (L1≤λ/2π). In a case that the managed object 105 influences a frequency characteristic of the tag antenna 112, when the managed object 105 is positioned within a range of the reactive near field in which the first distance L1 satisfies the relation (L1≤λ/2π), a strength of an electromagnetic field formed by the tag antenna 112 becomes greater, compared with a case of the radiative near field in which a relation (λ≥L1>λ/2π) is satisfied. Additionally, contributions of a quasi-static electromagnetic field and an induction electromagnetic field that stay close to the tag antenna 112 relatively increase, and a contribution of a radiation electromagnetic field decreases.

Accordingly, in the UHF band RFID system 1 according to the first example embodiment, when the first distance L1 is within a range of the reactive near field in which the relation (L1≤λ/2π) is satisfied, coupling between the managed object 105 and the tag antenna 112 becomes stronger. Consequently, influence of presence or absence the managed object 105 on an operating characteristic of the tag antenna 112 increases. Thus, in the UHF band RFID system 1 according to the first example embodiment, a change in a reflected electromagnetic field transmitted from the first-type RFID tag 104 to the UHF band RFID reader 103, the change being based on presence or absence of a managed object 105, increases, and a UHF band RFID system tolerant of disturbance and noise can be provided, enabling securer suppression of erroneous detection of presence or absence of the managed object 105.

Further, in the UHF band RFID system 1 according to the first example embodiment, the second distance L2 being a line-of-sight distance between the reader antenna 102 and the tag antenna 112 may be set to satisfy a relation (L2≤λ/2π). By the line-of-sight distance, that is, the second distance L2, thus satisfying the relation (L2≤λ/2π) in the UHF band RFID system 1 according to the first example embodiment, contributions of a quasi-static electromagnetic field and an induction electromagnetic field that stay close to the antennas become relatively larger, compared with the radiative near field in which the line-of-sight distance L2 satisfies a relation (λ≥L2>λ/2π), and coupling between the reader antenna 102 and the tag antenna 112 becomes stronger.

Accordingly, in the UHF band RFID system 1 according to the first example embodiment, when the second distance L2 being a line-of-sight distance is within a range of the reactive near field in which the relation (L2≤λ/2π) is satisfied, communication between the UHF band RFID reader 103 and the first-type RFID tag 104 can also be made less susceptible to disturbance and noise. Consequently, the UHF band RFID system 1 according to the first example embodiment is able to provide a UHF band RFID system less susceptible to disturbance and noise. Further, electromagnetic field components of the quasi-static electromagnetic field, the induction electromagnetic field, and the radiation electromagnetic field coexist at sufficient strengths, and a direction of a vector temporally changes in a various manner, and therefore the UHF band RFID system 1 according to the first example embodiment is able to improve a degree of freedom of relative directions of the reader antenna 102 and the tag antenna 112.

Furthermore, in the UHF band RFID system 1 according to the first example embodiment, by configuring the second distance L2 being a line-of-sight distance to satisfy the relation (L2≤λ/2π), the line-of-sight distance between the reader antenna 102 and the first-type RFID tag 104 becomes approximately 0.05 m or less in a case of the UHF band being one of the RFID standard frequencies, as indicated in FIG. 5. Accordingly, the UHF band RFID system 1 according to the first example embodiment is able to provide a UHF band RFID system not requiring a large space between the reader antenna 102 and the first-type RFID tag 104. For example, even a narrow commodity shelf is able to house the reader antenna 102, the first-type RFID tag 104, and a managed article, that is, the managed object 105. Additionally, by a narrowed interval between the reader antenna 102 and the first-type RFID tag 104, an incident of an object or a person different from the managed object 105 entering the interval can be further suppressed, and erroneous detection of presence or absence of the managed object 105 due to blocking of a line of sight can be more securely suppressed.

On the other hand, in a commonly known commodity management system employing management by affixing an RFID tag to a commodity on a commodity shelf, a position where an RFID tag is affixed changes by a commodity to which the RFID tag is affixed. Accordingly, the second distance L2 being a line-of-sight distance satisfying the relation (L2≤λ/2π), as described above, limits a commodity type or limits an affixed position of an RFID tag, and therefore is not preferable. Consequently, when an RFID tag is affixed to a managed article, that is, a managed object 105, to be managed, it is required to use an antenna using a radiation electromagnetic field capable of communication up to the far field in order to enable communication between the reader antenna and the RFID tag at a rather long distance. Consequently, in the case of the common commodity manage system, use of an open-type transmission line basically aiming for suppression of radiation and transmission of an electromagnetic wave in a longitudinal direction of the line is not suitable, and a commonly used resonant-type antenna or a leaky coaxial cable is used.

However, when such a reader antenna highly efficiently generating a radiation electromagnetic field is used, a signal strength of the radiation electromagnetic field attenuates only in proportion to (1/r) with respect to a distance r from a wave source, and therefore a reading area broadens. Consequently, a malfunction in terms of commodity management such as erroneously reading an RFID tag affixed to a commodity on an adjacent and separate commodity shelf is likely to occur.

By contrast, as described above, instead of affixing a first-type RFID tag 104 to a commodity, that is, a managed object 105, the UHF band RFID system 1 according to the first example embodiment is readily able to provide, for example, laying a reader antenna 102 on a bottom surface of a commodity shelf, placing a first-type RFID tag 104 thereon within a range satisfying the relation (L2≤λ/2π) by suitably adjusting a coupling coefficient, and further placing thereon a managed commodity, that is, a managed object 105 in a managed object placement area 110. Accordingly, the UHF band RFID system 1 according to the first example embodiment is able to use an open-type transmission line basically aiming for suppression of radiation and transmission of an electromagnetic wave in a longitudinal direction of the transmission line.

Consequently, the UHF band RFID system 1 according to the first example embodiment is able to use a reader antenna 102 that suppresses a radiation electromagnetic field a signal strength of which attenuates only in proportion to (1/r) with respect to a distance r from a wave source, and uses a quasi-static electromagnetic field attenuating in proportion to $(1/r^3)$ and an induction electromagnetic field attenuating in proportion to $(1/r^2)$ as main electromagnetic field components. Thus, when managing presence or absence of a commodity on a commodity shelf, limiting an area in which tag information of a first-type RFID tag 104 is read by one reader antenna 102 for commodity management becomes easier, decreasing a likelihood of occurrence of a problem of reading tag information of a first-type RFID tag 104 on an adjacent and separate commodity shelf.

While the example of commodity management of a commodity shelf has been used for the description above, it is needless to say that, even when managing an article on a shelf other than a commodity shelf or a floor-standing article, similarly limiting an area in which article management is performed, by limiting an area in which tag information of a first-type RFID tag 104 is read by one reader antenna 102, can be readily provided.

Further, the UHF band RFID system 1 according to the first example embodiment may be configured in such a way that the first distance L1 between a first-type RFID tag 104 and a managed object 105, and the second distance L2 being a line-of-sight distance between the reader antenna 102 and a tag antenna 112 satisfy a relation (L2>L1). While a strength of electromagnetic field coupling changes by structures of antennas and a resonator, and a characteristic of a medium between the antennas, the strength also greatly depends on distance. By configuring the UHF band RFID system 1 according to the first example embodiment to satisfy the relation (L2>L1), a coupling coefficient k2 between the managed object 105 placed in a managed object placement area 110 and the tag antenna 112 can be set to take a value greater than a coupling coefficient k1 between the reader antenna 102 and the tag antenna 112.

In other words, by securing the relation (L2>L1) between the first distance L1 and the second distance L2 being a line-of-sight distance, a change in a reflected wave strength due to a frequency characteristic change of the tag antenna 112 based on presence or absence of an article, that is, the managed object 105, can be made greater than that based on maintenance of communication between the tag antenna 112 and the reader antenna 102. Thus, the UHF band RFID system 1 according to the first example embodiment is able to securely grasp presence or absence of the managed object 105, and therefore is able to suppress erroneous detection of presence or absence of the managed object 105.

Further, the UHF band RFID system 1 according to the first example embodiment may set the coupling coefficient k1 between the reader antenna 102 and a tag antenna 112 to a value greater than or equal to $10^{-5}$. Power receiving sensitivity providing an operation limit of a current UHF band RFID tag is approximately −20 dBm, whereas an output of a high-output UHF band RFID reader is 30 dBm. Accordingly, as long as the coupling coefficient k1 between the reader antenna 102 and the tag antenna 112 takes a value greater than or equal to $10^{-5}$, electric power capable of operating a first-type RFID tag 104 can be fed from the reader antenna 102 of the UHF band RFID reader 103 even when a current UHF band RFID tag is used as the first-type RFID tag 104.

Further, the UHF band RFID system 1 according to the first example embodiment may set the coupling coefficient k1 between the reader antenna 102 and the tag antenna 112 to a value less than or equal to $10^{-2}$. When the tag antenna 112 is viewed as a dipole resonator, electromagnetic field coupling between the reader antenna 102 (e.g. an open-type transmission line) and the tag antenna 112 can be interpreted circuit-wise as coupling between an open-type transmission line and a dipole resonator. Accordingly, when the coupling coefficient k1 is excessively large, the dipole resonator greatly influences operation of the open-type transmission line, and consequently influences operation of another first-type RFID tag 104, as a coupling resonator system.

A situation of a plurality of resonators being coupled with an open-type transmission line in parallel may be considered as a band-rejection filter circuit. In that case, when copper or aluminum is used as a material for a tag antenna of a UHF band RFID tag, an unloaded Q factor at a normal temperature is mostly 100 or less, and therefore when the coupling coefficient k1 determining a fractional bandwidth takes a value less than or equal to $10^{-2}$, operation of the open-type transmission line is hardly influenced. Accordingly, by setting the coupling coefficient k1 to a value less than or equal to $10^{-2}$, influence of the coupling of the tag antenna 112 on the open-type transmission line can be suppressed, and mutual influence of the UHF band RFID readers 103 coupled with the open-type transmission line in parallel can also be suppressed.

Further, the UHF band RFID system 1 according to the first example embodiment may configure the coupling coefficient k1 between the reader antenna 102 and a tag antenna 112, and the coupling coefficient k2 between a managed object 105 and the tag antenna 112 in a case that the managed object 105 exists in a managed object placement area 110 in such a way to satisfy a relation (k1<k2), as described above. Thus, k1 and k2 are configured to satisfy the relation (k1<k2), that is, the coupling coefficient k2 between the managed object placement area 110 in which the managed object 105 is placed and the tag antenna 112 is configured to be greater than the coupling coefficient k1 between the reader antenna 102 and the tag antenna 112. Consequently, a change in a reflected signal strength due to a frequency characteristic change of the tag antenna 112 based on presence or absence of an article, that is, the managed object 105, can be made greater than that based on maintenance of communication between the reader antenna 102 and the tag antenna 112. Thus, the UHF band RFID system 1 according to the first example embodiment is able to securely grasp presence or absence of the managed object 105, and therefore is able to suppress erroneous detection of presence or absence of the managed object 105. Accordingly, presence or absence of a managed object can be securely grasped while identifying a location where the managed object exists from a size about the same as a tag.

Second Example Embodiment

Next, referring to drawings, a second example embodiment of the present invention will be described in detail. A case that a UHF band RFID system according to the second example embodiment includes, as a reader antenna 102, a near-field traveling-wave antenna using a coplanar line as an open-type transmission line will be described. Note that, in the description of the second example embodiment, a component same as that described in the first example embodiment is given a same reference sign as that in the first example embodiment, and detailed description thereof is omitted. FIG. 6 is a top view illustrating an example of a UHF band RFID system 2 according to the second example embodiment of the present invention viewed from the top, and a form of the reader antenna 102 viewed from the top in the UHF band RFID system 2 is illustrated along with a positional relation between a managed object placement area 110 in which a managed object 105 is placed and a first-type RFID tag 104. Similarly to FIG. 2 in the first example embodiment, the top view in FIG. 62 is an enlarged view of a managed object placement area 110 in which one managed object 105 is placed on one first-type RFID tag 104.

As illustrated in the top view in FIG. 6, in the UHF band RFID system 2 according to the second example embodiment of the present invention, a coplanar line composed of a central conductor 102b and two grounding conductors 102c placed to sandwich the central conductor 102b is formed on a front surface side of the reader antenna 102. Compared with the case of using a microstrip line, that is, the strip conductor 102b, illustrated in FIG. 2 in the first example embodiment, in a case of the coplanar line, an electric field distribution is more likely to be induced on the front surface, and, correspondingly, the reader antenna 102 and a tag antenna 112 are more likely to be electric field coupled.

Further, while, similarly to the first example embodiment, the first-type RFID tag 104 and the reader antenna 102 are placed below a managed object 105 placed in the managed object placement area 110, the UHF band RFID system 2 according to the second example embodiment is able to operate even in a state that, for example, an undersurface of the reader antenna 102 is rotated by 90 degrees in such a way that the undersurface becomes a side-wall surface. Additionally, it is needless to say that the UHF band RFID system 2 operates in a state that the undersurface of the reader antenna 102 is rotated by 180 degrees in such a way that the undersurface becomes a top surface. In other words, the UHF band RFID system 2 illustrated in FIG. 6 as the second example embodiment merely illustrates an example of a relative positional relation between the managed object placement area 110 in which the managed object 105 is placed, the first-type RFID tag 104, and the reader antenna 102.

Similarly to FIG. 2 in the first example embodiment, a difference between the UHF band RFID system 2 according to the second example embodiment and the technology described in aforementioned PTL 1 is placement of the central conductor 102b and the tag antenna 112. Similarly to FIG. 2 in the first example embodiment, the tag antenna 112 according to the second example embodiment is formed as a type of an electric-field antenna based on a dipole antenna, as illustrated in the top view in FIG. 6 as an example. A center part of the tag antenna 112 is narrowed to increase inductance, and both ends are thickened to increase capacitance to achieve downsizing compared with a common dipole antenna. Further, both ends of the tag antenna 112 are bent for downsizing.

As described above, the tag antenna 112 is a type of an electric-field antenna obtained by downsizing a dipole antenna, and a direction with a higher sensitivity to an electric field mainly corresponds to a longitudinal direction of the rectangle-shaped first-type RFID tag 104 (a vertical direction in the top view in FIG. 6). Similarly to the strip conductor 102b according to the first example embodiment, the longitudinal direction of the rectangle-shaped first-type RFID tag 104 and a longitudinal direction of the central conductor 102b are placed in such a way to be orthogonal to one another. Further, the tag antenna 112 is placed separately from a center of the central conductor 102b. Such a placement enables the tag antenna 112 to sense with high sensitivity an electric field passing from the central conductor 102b toward the grounding conductor 102c. In other words, similarly to the first example embodiment, the reader antenna 102 and the tag antenna 112 are mainly electric field coupled in the placement according to the second example embodiment.

Accordingly, similarly to the first example embodiment, in the configuration of the UHF band RFID system 2 according to the second example embodiment, an electric-field antenna may be used as the tag antenna 112 of the first-type RFID tag 104, and the reader antenna 102 and the tag antenna 112 may be placed in such a way to be electric field coupled, enabling secure grasp of presence or absence of a managed object 105.

Third Example Embodiment

Figure 7:
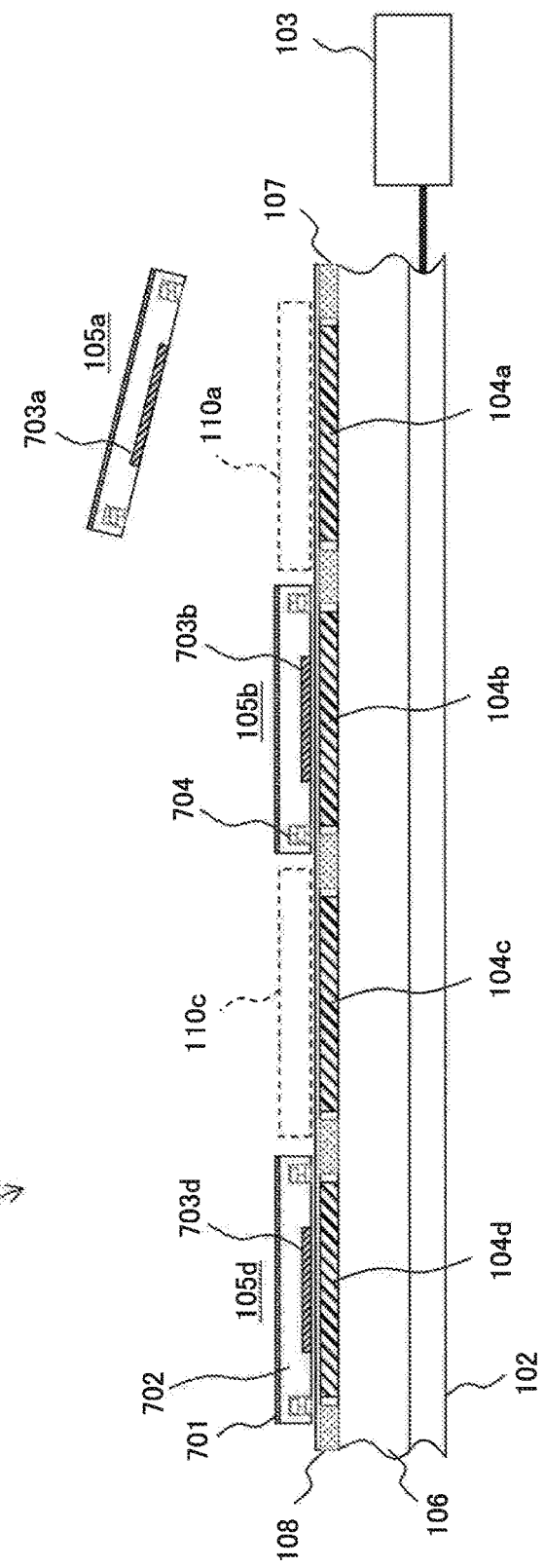
FIG. 7 is a front view illustrating an example of a UHF band RFID system according to a third example embodiment of the present invention viewed from the front.

Next, referring to drawings, a third example embodiment of the present invention will be described in detail. FIG. 7 is a front view illustrating an example of a UHF band RFID system according to the third example embodiment of the present invention viewed from the front. The diagram exemplifies a state that a managed object 105a is being newly placed on a first-type RFID tag 104a at the right end of the drawing, out of a plurality of first-type RFID tags 104 (four tags, the first-type RFID tag 104a, a first-type RFID tag 104b, a first-type RFID tag 104c, and a first-type RFID tag 104d being illustrated in FIG. 7).

As illustrated in the front view in FIG. 7, the UHF band RFID system 3 according to the third example embodiment of the present invention includes a reader antenna 102, a UHF band RFID reader 103, passive first-type RFID tags 104 each including an electric-field antenna (each of reference signs 104a, 104b, 104c, 104d, . . . being represented by a reference sign 104 unless there is a need for a distinction), managed objects 105 (each of reference signs 105a, 105b, 105c, 105d, . . . being represented by a reference sign 105 unless there is a need for a distinction), a spacer 106, a magnetic fixing plate 107, and a decorative material 108. Similarly to the first example embodiment, managed object placement areas 110 (each of reference signs 110a, 110b, 110c, 110d, . . . being represented by a reference sign 110 unless there is a need for a distinction) for placing managed objects 105 are provided on the first-type RFID tags 104.

For example, the reader antenna 102 according to the third example embodiment may include an open-type transmission line as a microstrip line, that is, a strip conductor 102b, to configure a matched-terminated near-field traveling-wave antenna, similarly to the first example embodiment, or may be a near-field traveling-wave antenna using another open-type transmission line. An end of the reader antenna 102 not being matched-terminated is connected to the UHF band RFID reader 103.

As illustrated in the front view in FIG. 7, the spacer 106 for adjusting a strength of electric-field coupling between the reader antenna 102 and a passive first-type RFID tag 104 including an electric-field antenna as a tag antenna may exist in between on a top surface of the reader antenna 102. It is desirable that the spacer 106 be a nonmagnetic insulator for passing an electromagnetic field. It is more desirable that a relative dielectric constant of the spacer 106 take a small value close to "1." The reason is that, when the tag antenna of the first-type RFID tag 104 receives a signal from the reader antenna 102 and become excited, such a spacer 106 facilitates an electric field to spread around the first-type RFID tag 104.

When the electric field spreads around the first-type RFID tag 104, operation of the tag antenna becomes more likely to be influenced by presence or absence of a managed object 105, and, consequently, presence or absence of the managed object 105 can be securely grasped. The passive first-type RFID tag 104 according to the third example embodiment is also placed in such a way to be electric field coupled with the reader antenna 102 through the spacer 106, as described in the first or second example embodiment.

Further, according to the third example embodiment, as illustrated in FIG. 7, a second-type RFID tag 703 is fixed to an undersurface of a managed object 105, and a top surface and a side surface of the second-type RFID tag 703 is covered by a resin plate 702. Further, according to the third example embodiment, a metallic plate 701 is affixed to a top surface of the managed object 105, that is, a top surface of the resin plate 702, and a magnet 704 is embedded in the resin plate 702. Providing the metallic plate 701 on the top surface enables a larger signal strength change of a first-type RFID tag 104, the change being based on presence or absence of the managed object 105. While the front view in FIG. 7 does not illustrate an exterior material of the managed object 105, the exterior material of the managed object 105 may exist, as long as the material does not hinder the reader antenna 102 from reading tag information of the second-type RFID tag 703.

Figure 8:
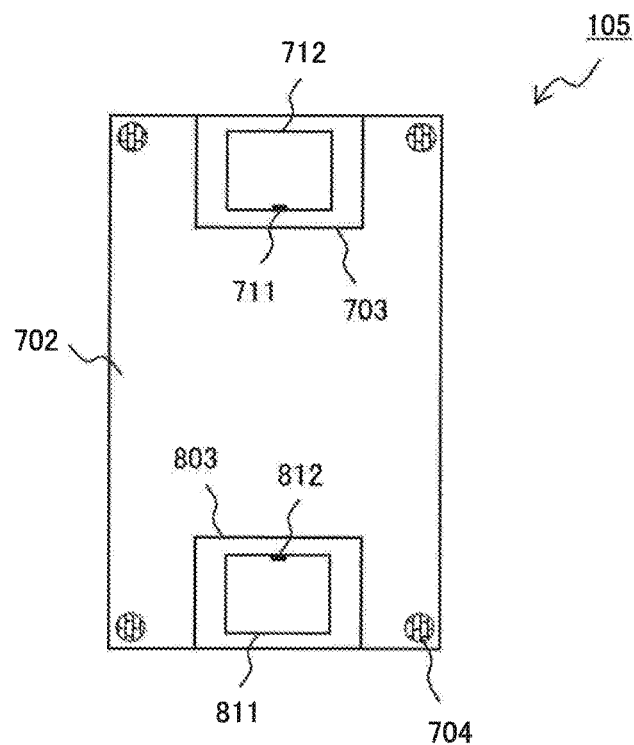
FIG. 8 is a bottom view illustrating an example of a managed object viewed from the bottom in the UHF band RFID system according to the third example embodiment of the present invention.

FIG. 8 is a bottom view illustrating an example of a managed object 105 viewed from the bottom in the UHF band RFID system 3 according to the third example embodiment of the present invention. As illustrated in the bottom view in FIG. 8, two second-type RFID tags being a second-type RFID tag 703 and a second-type RFID tag 803 are fixed to the undersurface of the managed object 105. Tag information of each of the second-type RFID tag 703 and the second-type RFID tag 803 is stored in an RFID chip 711 and an RFID chip 811, respectively. The RFID chip 711 and the RFID chip 811 are connected to micro loop antennas, each of which being modified to a rectangular shape, as a tag antenna 712 and a tag antenna 812, respectively.

Each of the tag antenna 712 of the second-type RFID tag 703 and the tag antenna 812 of the second-type RFID tag 803 is not limited to a micro loop antenna modified to a rectangular shape. For example, the antenna may be a magnetic-field antenna such as a slot antenna. Further, tag information of the second-type RFID tag 703 and tag information of the second-type RFID tag 803 may be same or different.

For example, when the reader antenna 102 is formed in such a way that a plurality of microstrip lines as described in the first example embodiment, that is, the strip conductors 102b, are placed in parallel, and sufficiently separated compared with a size of each of the second-type RFID tag 703 and the second-type RFID tag 803, it is less likely that both tag information of the second-type RFID tag 703 and tag information of the second-type RFID tag 803 are read at the same time, and the tag information of either tag is read. Accordingly, in such a case, by making the tag information of the second-type RFID tag 703 and the tag information of the second-type RFID tag 803 identical and associating each piece of tag information with information for identifying a managed object 105, the managed object 105 can be identified independent of which piece of tag information is read.

On the other hand, when a plurality of (e.g. two) microstrip lines, that is, the strip conductors 102b placed in parallel are placed separately at an interval between longitudinal directions of the second-type RFID tag 703 and the second-type RFID tag 803, a direction of a managed object 105 with respect to the reader antenna 102 can be distinguished by identifying which strip conductor 102b reads tag information of the second-type RFID tag 703 and tag information of the second-type RFID tag 803.

Further, as illustrated in the bottom view in FIG. 8, for example, magnets 704 are embedded at four corners of the managed object 105. Thus, the magnets 704 in the managed object 105 are attracted to the magnetic fixing plates 107 placed on a top surface side of the spacer 106 on the reader antenna 102 in order to specify a managed object placement area 110, and the managed object 105 can be correctly fixed to the managed object placement area 110. At that time, the system may be configured in such a way that the managed object 105 is attracted only at specific locations or intervals, depending on shapes and placement positions of the magnets 704 and the magnetic fixing plates 107. A magnetic material such as SUS400 series (stainless steel) or iron may be used as a material of the magnetic fixing plate 107.

Next, an operation of the UHF band RFID system 3 according to the third example embodiment will be described. In the UHF band RFID system 3 according to the third example embodiment, presence or absence of a managed object 105 is detected, based on a signal strength of a first-type RFID tag 104, while identifying a position of the managed object 105 from tag information of the first-type RFID tag 104. Additionally, at the same time, the managed object 105 can be identified by reading tag information of a second-type RFID tag 703 and/or a second-type RFID tag 803. That is to say, both an object type and a location of the managed object 105 can be identified by using simultaneity of read operations of the first-type RFID tag 104, and the second-type RFID tag 703 and/or the second-type RFID tag 803. At that time, as a matter of course, presence or absence of the managed object 105 can be securely grasped.

On performing the identification operation of both an object type and a location of a managed object 105, the UHF band RFID system 3 first transmits a tag information read command as a transmission signal from the UHF band RFID reader 103 through the reader antenna 102. Next, as illustrated in FIG. 7, each of a plurality of first-type RFID tags 104 receives the transmission signal transmitted through the reader antenna 102 by electric-field coupling through each tag antenna 112. Then, each first-type RFID tag 104 generates electric power using part of the received signal and starts the operation.

Each first-type RFID tag 104 starting the operation decodes the received transmission signal and reproduces received data included in the received transmission signal. Each first-type RFID tag 104 checks the received data against tag information included in a built-in storage circuit, and, when the received data and the tag information match, transmits a modulation signal as a response signal to the reader antenna 102 by using a random time slot.

The UHF band RFID reader 103 receiving a response signal from each first-type RFID tag 104 determines whether a strength of the response signal from a first-type RFID tag 104 related to the transmitted tag information read command is greater or less than a predetermined threshold value. Consequently, the UHF band RFID reader 103 determines presence or absence of a managed object 105 at a location related to tag information of each first-type RFID tag 104. More specifically, when a signal strength of a response signal from a first-type RFID tag 104 is greater than or equal to the threshold value, the UHF band RFID reader 103 determines that a managed object 105 does not exist in a managed object placement area 110 corresponding to the first-type RFID tag 104. Further, when a signal strength of a response signal from a first-type RFID tag 104 is less than the threshold value, the UHF band RFID reader 103 determines that a managed object 105 exists in a managed object placement area 110 corresponding to the first-type RFID tag 104.

The case of a signal strength of a response signal from a first-type RFID tag 104 being less than the threshold value includes a case that the signal strength of the response signal is less than a lower reception limit of the UHF band RFID reader 103, and the response signal cannot be received, and a case that, since a signal strength of a transmission signal when a first-type RFID tag 104 receives the transmission signal from the UHF band RFID reader 103 is less than or equal to a lower operating limit of the first-type RFID tag 104, the first-type RFID tag 104 is not able to operate stably and is not able to respond to the transmission signal.

For example, in the example illustrated in the front view in FIG. 7, a managed object 105 does not yet exist in the managed object placement area 110a on the first-type RFID tag 104a placed at the right end of the drawing, and therefore the first-type RFID tag 104a is able to transmit a response signal at a signal strength greater than or equal to the threshold value. Accordingly, the UHF band RFID reader 103 is able to receive a strong response signal from the first-type RFID tag 104a along with tag information. The tag information is previously associated with a location of the first-type RFID tag 104a, and the UHF band RFID reader 103 determines from the signal strength of the response signal that a managed object 105 does not exist in the position related to the first-type RFID tag 104a.

On the other hand, in the example illustrated in the front view in FIG. 7, the managed object 105d is placed in the managed object placement area 110d on the first-type RFID tag 104d placed at the left end, and therefore a signal strength of a response signal transmitted by the first-type RFID tag 104d is less than the threshold value. Accordingly, the UHF band RFID reader 103 determines that the managed object 105d exists in a position related to the first-type RFID tag 104d. The UHF band RFID reader 103 also determines, as described above, that the managed object 105d exists in a position related to the first-type RFID tag 104d when the response signal from the first-type RFID tag 104d cannot be received within a predetermined certain period.

At that time, when tag information of the first-type RFID tag 104d cannot be obtained within the certain period, similarly to the first example embodiment, since the UHF band RFID reader 103 previously grasps that the first-type RFID tag 104d exists on the front surface of the reader antenna 102, the UHF band RFID reader 103 is able to determine that the managed object 105d exists at a location indicated by tag information of the first-type RFID tag 104d from which a response signal cannot be obtained within the certain period. The certain period is determined from a number of first-type RFID tags 104 placed on the front surface of the reader antenna 102, a number of second-type RFID tags 703 and second-type RFID tags 803 in positions where the tags can be read, and a tag reading speed of the UHF band RFID reader 103, and it is desirable that the period be a time in which tag information of a necessary and sufficient number of first-type RFID tags 104, second-type RFID tags 703, and second-type RFID tags 803 can be read.

Further, the UHF band RFID reader 103 is connected to a computer or functions as part of a computer, and determination of presence or absence of a managed object 105 may be performed by the computer.

As described above in the first example embodiment, it is important to make a greater change in a signal strength of a response signal, the change being based on presence or absence of a managed object 105, and securely grasp presence or absence of a managed object 105. As described above, a managed object 105 is generally composed of materials with different relative dielectric constants and electric conductivities. A case that operation of a tag antenna 112 of a first-type RFID tag 104 may greatly change based on presence or absence of a managed object 105 even in such a case is when the tag antenna 112 is an electric-field antenna. That is to say, it is desirable that the tag antenna 112 of the first-type RFID tag 104 be an electric-field antenna. Further, a case that coupling between the reader antenna 102 and a tag antenna 112 of a first-type RFID tag 104 greatly changes based on presence or absence of a managed object 105 is when a main coupling component between the reader antenna 102 and the tag antenna 112 of the first-type RFID tag 104 is electric-field coupling. That is to say, it is desirable that the reader antenna 102 and the tag antenna 112 of the first-type RFID tag 104 be electric field coupled.

On the other hand, it is important that a second-type RFID tag 703 and a second-type RFID tag 803 fixed to a managed object 105 be stably and securely read without reading performance thereof being influenced by a managed object 105, as long as the tags are close to the reader antenna 102. Accordingly, unlike the first-type RFID tag 104, it is desirable that the tag antenna 712 of the second-type RFID tag 703 and the tag antenna 812 of the second-type RFID tag 803 be magnetic-field antennas. Further, it is desirable that the reader antenna 102 be magnetic field coupled with the tag antenna 712 of the second-type RFID tag 703 and the tag antenna 812 of the second-type RFID tag 803.

Accordingly, when the tag antenna 712 and the tag antenna 812 are formed with micro loop antennas, it is desirable that the second-type RFID tag 703 and the second-type RFID tag 803 be placed by being fixed on a managed object 105 in such a way that a magnetic field generated by the reader antenna 102 passes through the micro loop antennas formed as the tag antenna 712 and the tag antenna 812.

More specifically, similarly to the first example embodiment, when a microstrip line, that is, the strip conductor 102b, is employed as an open-type transmission line used for the reader antenna 102, it is desirable that, when a managed object 105 is placed in a managed object placement area 110, a tag antenna 812 (or a tag antenna 712) be installed in proximity to a side of the strip conductor 102b, as illustrated in FIG. 9. The reason is that there is a strong magnetic field distribution surrounding a section of the strip conductor 102b. FIG. 9 is a top view illustrating an example of a positional relation between a second-type RFID tag 803 (or a second-type RFID tag 703) and the reader antenna 102 in the UHF band RFID system 3 according to the third example embodiment of the present invention.

Furthermore, when the tag antenna 812 (or the tag antenna 712) has a rectangular shape as illustrated in FIG. 9, it is desirable that a longitudinal direction thereof be arranged in parallel with a longitudinal direction of the strip conductor 102b. The reason is that the parallel arrangement provides a stronger magnetic field passing through the tag antenna 812 (or the tag antenna 712). The aforementioned description about the positional relation and the antennas holds in a case of using a coplanar line as the reader antenna 102, similarly to the second example embodiment, and a similar and desirable placement can be obtained merely by replacing the aforementioned strip conductor 102b with the central conductor 102b.

The description of the operation of the UHF band RFID system 3 according to the third example embodiment will be continued. In a state illustrated in FIG. 7, when the managed object 105b and the managed object 105d already exist on the reader antenna 102, unless a signal strength of each response signal of the first-type RFID tag 104b and the first-type RFID tag 104d subsequently changes to be greater than or equal to the threshold value, and the managed object 105b and the managed object 105d are determined to no longer exist, the UHF band RFID system 3 continues to determine that the managed object 105b and the managed object 105d continue to exist on the first-type RFID tag 104b and the first-type RFID tag 104d, respectively.

Alternatively, in particular, as long as a state that response signals of the second-type RFID tag 703b (or the second-type RFID tag 803b) and the second-type RFID tag 703d (or the second-type RFID tag 803d) continue to be detected continues, the UHF band RFID system 3 may continue to determine that the managed object 105b and the managed object 105d continue to exist on the first-type RFID tag 104b and the first-type RFID tag 104d, respectively. However, in such a case that determination is made by a response signal of a second-type RFID tag 703 (or a second-type RFID tag 803), when a managed object 105 is placed while being slid on the reader antenna 102, erroneous detection of presence or absence of a managed object 105 may occur.

By contrast, in a case that determination is made by a response signal of a first-type RFID tag 104, for example, even when the managed object 105b is slid to a location of the managed object 105c, a response signal of the first-type RFID tag 104b changes from "the managed object 105b present" to "the managed object 105b absent," while a response signal of the first-type RFID tag 104c changes from the managed object 105c absent to the managed object 105c present, and therefore the managed object 105b being slid to the location of the managed object 105c can be securely detected. While an expression "sliding a managed object 105" has been used in the description, such an expression refers to a situation that a managed object 105 moves between managed object placement areas 110 while maintaining a state that upward separation of the managed object 105 is kept within a distance where existence of the managed object 105 can be detected by a first-type RFID tag 104 on the reader antenna 102.

Next, a situation that the managed object 105a is newly placed in the managed object placement area 110a in a state illustrated in FIG. 7 in which the managed object 105b and the managed object 105d exist in the managed object placement area 110b and the managed object placement area 110d, respectively, will be described. When the managed object 105a is placed in the managed object placement area 110a, it is perceived from tag information and a signal strength of the first-type RFID tag 104a that some managed object 105 is placed in the managed object placement area 110a. At the same time, reading of tag information of the second-type RFID tag 703a (or the second-type RFID tag 803a) fixed to the managed object 105a starts, and it becomes clear from the tag information that the newly placed managed object 105 is the managed object 105a. When there is no move by another managed object 105 in a series of such operations, it is perceived that some new managed object 105 is placed in the managed object placement area 110a, and the managed object 105 placed in the managed object placement area 110a may be identified as the managed object 105a. That is to say, the UHF band RFID system 3 according to the third example embodiment provides a UHF band RFID system identifying both an object type and a location of a managed object 105.

Furthermore, when the managed object 105a is subsequently removed from the managed object placement area 110a, it is perceived from the tag information and the signal strength of the first-type RFID tag 104a that some managed object 105 is removed from the managed object placement area 110a. At the same time, reading of the tag information of the second-type RFID tag 703a (or the second-type RFID tag 803a) fixed to the managed object 105a stops, and it becomes clear from the unreadable tag information that the removed managed object 105 is the managed object 105a. When there is no move by another managed object 105 in a series of such operations, it may be identified that a managed object 105 is removed from the managed object placement area 110a, and the removed managed object 105 is the managed object 105a.

When the managed object 105 illustrated in FIG. 8 is affixed to the reader antenna 102 illustrated in FIG. 9, a location where the managed object 105 is placed can be detected by the first-type RFID tag 104. Besides, out of the second-type RFID tag 703 and the second-type RFID tag 803 that are affixed to the managed object 105, tag information can be read only from the second-type RFID tag 803 (or the second-type RFID tag 703) closer to the strip conductor 102b in FIG. 9. Accordingly, a placement situation of the managed object 105 in a vertical direction with respect to the reader antenna 102 can also be distinguished.

For example, a case of attracting the managed object 105 illustrated in FIG. 8 to the managed object placement area 110a in FIG. 7 will be described. It is assumed with respect to a relative position between the strip conductor 102b and the managed object placement area 110a, and a placement of the second-type RFID tag 703 and the second-type RFID tag 803 on the managed object 105a that the second-type RFID tag 703 and the second-type RFID tag 803 are separately placed in such a way that tag information can be read from only either of the second-type RFID tag 803 or the second-type RFID tag 703 that is closer to the strip conductor 102b, out of the second-type RFID tag 703 and the second-type RFID tag 803 fixed to the managed object 105. By such a placement, when the managed object 105a is attracted to the managed object placement area 110a, the managed object 105a being attracted to the managed object placement area 110a can be detected by a change in a signal strength of the first-type RFID tag 104a. Moreover, an orientation of the managed object 105a in a vertical direction can be distinguished based on from which of the second-type RFID tag 703 or the second-type RFID tag 803 tag information thereof is read.

Further, when a plurality of managed object placement areas 110 are placed in a vertical direction, and a vertical orientation of a managed object 105 is adjusted and then attracted, depending on whether each managed object placement area 110 is an even-numbered area or an odd-numbered area from the top, whether a managed object 105 exists in an even-numbered area such as a second tier, a fourth tier, . . . of the managed object placement areas 110 from the top or the managed object 105 exists in an odd-numbered area such as a first tier, a third tier, . . . of the managed object placement areas 110 from the top can be identified, based on from which of the second-type RFID tag 703 or the second-type RFID tag 803 tag information can be read.

Figure 10:
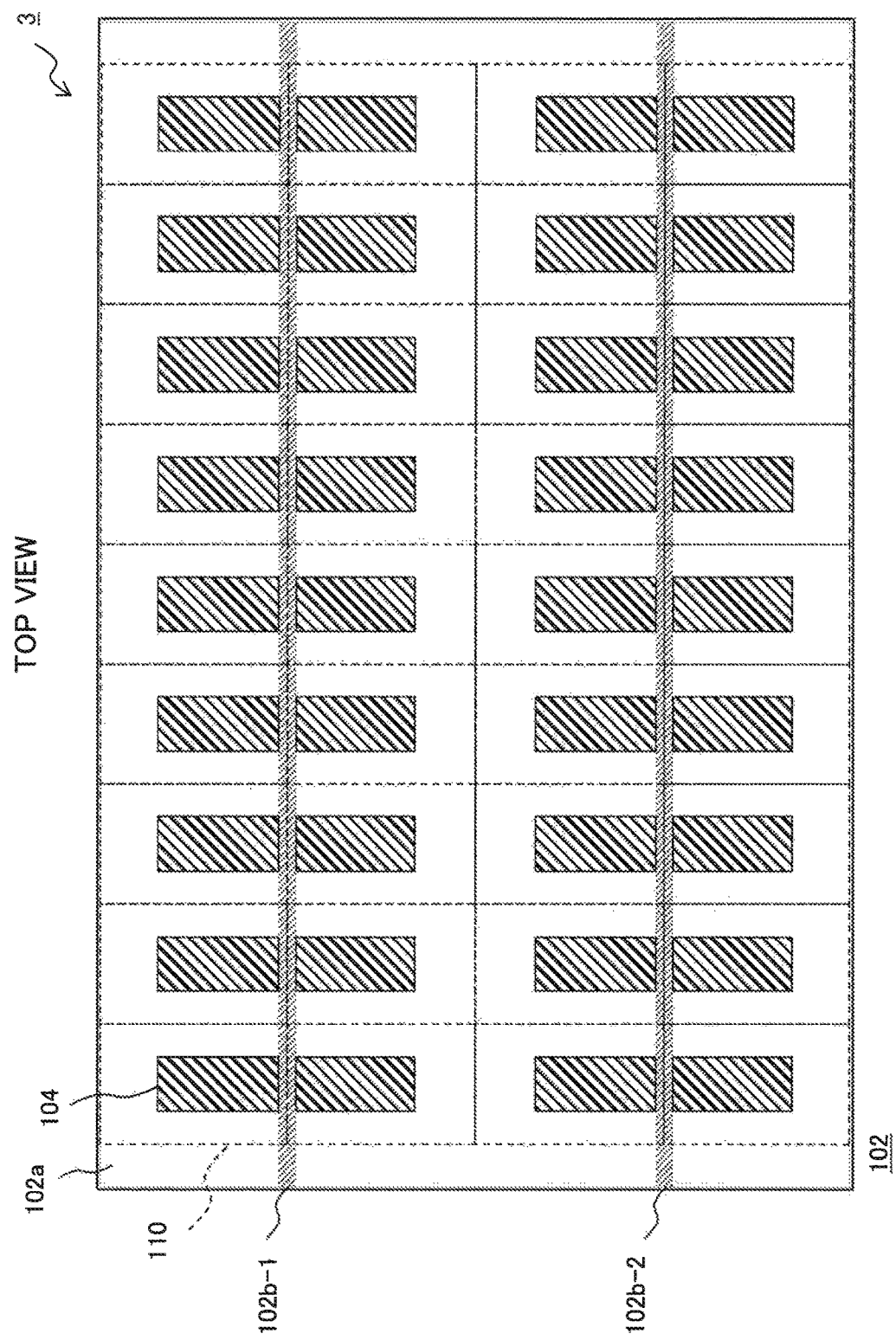
FIG. 10 is a top view illustrating another example of a positional relation between a managed object placement area, a first-type RFID tag, and a reader antenna in the UHF band RFID system according to the third example embodiment of the present invention.

Furthermore, as illustrated in FIG. 10, by configuring the strip conductor 102b in the reader antenna 102 in such a way that a plurality of strip conductors 102b such as a strip conductor 102b-1, a strip conductor 102b-2, . . . are placed in parallel, a tier of a managed object placement area 110 in which a managed object 105 exists can be distinguished. FIG. 10 is a top view illustrating another example of a positional relation between a managed object placement area 110, a first-type RFID tag 104, and the reader antenna 102 in the UHF band RFID system 3 according to the third example embodiment of the present invention. The figure illustrates an example that a plurality of managed object placement areas 110 are placed not only in a horizontal direction but also in a vertical direction, and a plurality of reader antennas 102 being a strip conductor 102b-1, a strip conductor 102b-2, . . . are placed in parallel in a sequential order from the top.

As illustrated in the top view in FIG. 10, when the reader antenna 102 is composed of a plurality of strip conductors 102b being the strip conductor 102b-1, the strip conductor 102b-2, . . . , in which tier of the managed object placement areas 110 in a vertical direction from the top a managed object 105 exists can be grasped by utilizing information about whether the strip conductor 102b being able to read tag information of either the second-type RFID tag 703 or the second-type RFID tag 803 is the strip conductor 102b-1, the strip conductor 102b-2, or any of the other strip conductors 102b. In such a case, a role of the first-type RFID tag 104 is to detect in which row of the managed object placement areas 110 in a horizontal direction the managed object 105 exists.

The information obtained from the second-type RFID tag 703, the second-type RFID tag 803, or the strip conductor 102b described above is complementary information to positional information identified from a signal strength of the first-type RFID tag 104, and is able to relax the aforementioned simultaneity condition that there is no move by another managed object 105 in a series of move operations of a managed object 105. In other words, by utilizing the aforementioned information obtained from the second-type RFID tag 703, the second-type RFID tag 803, or the strip conductor 102b, whether or not a plurality of managed objects 105 in different tiers of the managed object placement areas 110 are moving at the same time can be distinguished.

Furthermore, by making a back surface of a managed object 105 a square shape and fixing second-type RFID tags 703 and second-type RFID tags 803 to the back surface of the managed object 105 along each of the four sides, a state of rotation for every 90° as a placement state of the managed object 105 can be distinguished. Thus, by affixing a plurality of second-type RFID tags 703 and second-type RFID tags 803 to the managed object 105, a relative placement including an angle with respect to the reader antenna 102 can be detected.

Figure 11:
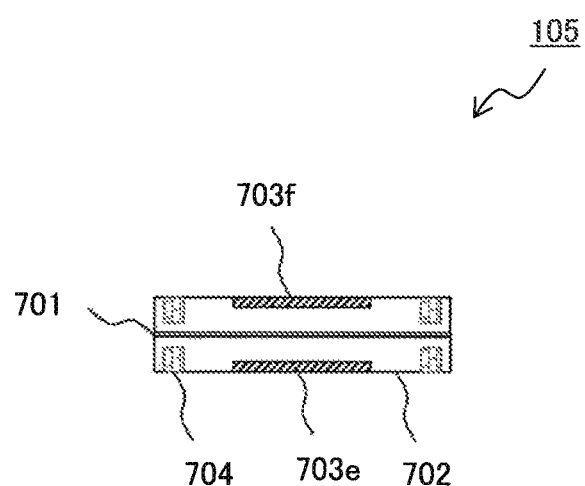
FIG. 11 is a cross-sectional view illustrating another example of a managed object in the UHF band RFID system according to the third example embodiment of the present invention.

Furthermore, as illustrated in FIG. 11, by fixing a second-type RFID tag 703e and a second-type RFID tag 703f to both surfaces of a managed object 105 being a back surface side and a front surface side, respectively, and assigning different tag information to each tag, the two sides of the managed object 105 placed in a managed object placement area 110 can be distinguished. FIG. 11 is a cross-sectional view illustrating another example of a managed object 105 in the UHF band RFID system 3 according to the third example embodiment of the present invention, and illustrates an example that the second-type RFID tag 703e and the second-type RFID tag 703f are fixed to both surfaces of the managed object 105 being a front surface side and a back surface side, respectively.

Though not necessarily required, it is desirable that the metallic plate 701 exist between the second-type RFID tag 703e and the second-type RFID tag 703f. The reason is that a signal of the reader antenna 102 is blocked by the metallic plate 701, and therefore tag information can be read only from either of the second-type RFID tag 703e or the second-type RFID tag 703f depending on the side of the managed object 105 (front surface or the back surface), facilitating determination of the two sides of the managed object 105. However, even when the metallic plate 701 does not exist in between, which of the second-type RFID tag 703e or the second-type RFID tag 703f is closer to the reader antenna 102 can be detected by comparing a signal strength responded by each of the two, and therefore the two sides of the managed object 105 can be determined.

For example, the UHF band RFID system 3 described above as the third example embodiment may be utilized as a process management board by which a process in a manufacture line is put down on a top surface of a managed object 105, and the process information is automatically incorporated into a computer connected to the UHF band RFID reader 103. Further, the UHF band RFID system 3 may be utilized as an attendance status management board by which a name of a worker whose attendance status is indicated is put down on a top surface of a managed object 105, and the name information of the worker is automatically incorporated into a computer connected to the UHF band RFID reader 103. Additionally, the UHF band RFID system 3 may be utilized as a piece in a game such as reversi or chess by using a managed object 105 the two sides of which can be determined as illustrated in FIG. 11, and putting down colors and/or a character related to the two sides of the managed object 105, respectively, in such a way that the color information and/or the character information is automatically incorporated into a computer connected to the UHF band RFID reader 103. However, it is needless to say that uses of the third example embodiment are not limited to the above, and various uses exist.

Fourth Example Embodiment

Next, referring to a drawing, a fourth example embodiment of the present invention will be described in detail. FIG. 12 is a cross-sectional view illustrating an example of a section of a UHF band RFID system 4 according to the fourth example embodiment of the present invention, and exemplifies, as an example of the UHF band RFID system 4 being installed on a floor surface of a specific location, a case that a specific shoe including second-type RFID tags 1201 is assumed as a managed object 105h, and the UHF band RFID system 4 is used for a purpose of monitoring a situation that a person wearing the shoe walks in the specific location where passive first-type RFID tags 104 each including electric-field antennas are placed.

As illustrated in the cross-sectional view in FIG. 12, the UHF band RFID system 4 according to the fourth example embodiment of the present invention includes a reader antenna 102, a UHF band RFID reader 103, the passive first-type RFID tags 104 (four tags being a first-type RFID tag 104h, a first-type RFID tag 104i, a first-type RFID tag 104j, and a first-type RFID tag 104k illustrated in FIG. 12) each including an electric-field antenna, second-type RFID tags 1201 (three tags being a second-type RFID tag 1201a, a second-type RFID tag 1201b, and a second-type RFID tag 1201c illustrated in FIG. 12) fixed to the managed object 105h, and a spacer 106.

For example, the reader antenna 102 may be a matched-terminated near-field traveling-wave antenna including a microstrip line, that is, a strip conductor 102b, similarly to the first example embodiment, as an open-type transmission line, or a near-field traveling-wave antenna using another open-type transmission line such as a coplanar line, similarly to the second example embodiment. An end of the reader antenna 102 not being matched-terminated is connected to the UHF band RFID reader 103.

Further, the spacer 106 for adjusting a strength of electric-field coupling between the reader antenna 102 and the passive first-type RFID tags 104 may exist in between on a top surface of the reader antenna 102. It is desirable that the spacer 106 be a nonmagnetic insulator in order to pass an electromagnetic field. It is more desirable that a relative dielectric constant of the spacer 106 take a small value close to "1." The reason is that, when the tag antenna of the first-type RFID tag 104 receives a signal from the reader antenna 102 and become excited, such a spacer 106 facilitates an electric field to spread around the first-type RFID tag 104. When the electric field spreads around the first-type RFID tag 104, operation of the tag antenna of the first-type RFID tag 104 is more likely to be influenced by presence or absence of the managed object 105h placed in a managed object placement area 110 on the first-type RFID tag 104, and, consequently, presence or absence of the managed object 105h can be securely grasped.

Further, similarly to the first or second example embodiment, a passive first-type RFID tag 104 is placed in such a way to be electric field coupled with the reader antenna 102 through the spacer 106. When the spacer 106 is not used, it is desirable that the tag antenna be previously designed in anticipation that the tag antenna of the first-type RFID tag 104 and the reader antenna 102 come close to one another, causing increase in a capacitance component of the tag antenna and decrease in a resonance frequency.

According to the fourth example embodiment of the present invention, a shoe worn by a specific person is assumed to be the managed object 105h, and the managed object 105h is mainly composed of the second-type RFID tags 1201, a shoe part 1202, and a human foot part 1203.

The second-type RFID tags 1201 (three tags being a second-type RFID tag 1201a, a second-type RFID tag 1201b, and a second-type RFID tag 1201c) are fixed to a sole of the shoe part 1202. As the fixing method of the second-type RFID tag 1201, a method of embedding a tag into the shoe part 1202 as is the case with the second-type RFID tag 1201a, a method of affixing a tag to an exterior of the shoe part 1202 as is the case with the second-type RFID tag 1201b, a method of fixing a tag between an interior of the shoe part 1202 and the foot part 1203 as is the case with the second-type RFID tag 1201c, or the like may be employed. Alternatively, a tag may be affixed to the foot part 1203.

Though not illustrated in FIG. 12, a structural material for making the reader antenna 102 floor-standing, a decorative material, an insole, a sock, and the like may be additionally included, as long as reading of tag information of a second-type RFID tag 1201 by the reader antenna 102 is not hindered.

Next, an operation of the UHF band RFID system 4 according to the fourth example embodiment will be described. Similarly to the third example embodiment, the UHF band RFID system 4 according to the fourth example embodiment detects presence or absence of a managed object 105, based on a signal strength of a first-type RFID tag 104, while identifying a position of the managed object 105 from tag information of the first-type RFID tag 104. Additionally, by reading tag information of a second-type RFID tag 1201, the managed object 105 can be identified at the same time. That is to say, use of simultaneity of the reading operations of the first-type RFID tag 104 and the second-type RFID tag 1201 enables identification of both an object type and a location of the managed object 105. At that time, as a matter of course, presence or absence of the managed object 105 can be securely grasped.

On performing the identification operations of both an object type and a location of a managed object 105, similarly to the third example embodiment, the UHF band RFID system 4 first transmits a tag information read command as a transmission signal from the UHF band RFID reader 103 through the reader antenna 102. Then, each of a plurality of first-type RFID tags 104 as illustrated in FIG. 12 receives the transmission signal transmitted through the reader antenna 102 by electric-field coupling through each tag antenna 112. Then, each first-type RFID tag 104 generates electric power by using part of the received signal and starts the operation.

Similarly to the first to third example embodiments, each first-type RFID tag 104 starting the operation decodes the received transmission signal and reproduces received data included in the received transmission signal. Each first-type RFID tag 104 checks the received data against tag information included in a built-in storage circuit, and, when the received data and the tag information match, transmits a modulation signal as a response signal to the reader antenna 102 by using a random time slot.

The UHF band RFID reader 103 receiving a response signal from each first-type RFID tag 104 determines whether a position related to tag information of each first-type RFID tag 104 is covered by a managed object 105, by determining whether a strength of the response signal from a first-type RFID tag 104 related to the transmitted tag information read command is greater or less than a predetermined threshold value. More desirably, the UHF band RFID reader 103 estimates whether or not the position is covered by a managed object 105 while interpolating a strength of the response signal from the first-type RFID tag 104 by using a position related to tag information of each first-type RFID tag 104. Then, when a signal strength of the interpolated response signal is greater than or equal to the predetermined threshold value, the UHF band RFID reader 103 determines that the position corresponding to the first-type RFID tag 104 is not covered by a managed object 105. When a signal strength of the response signal from the first-type RFID tag 104 is less than the threshold value, the UHF band RFID reader 103 determines that the position corresponding to the first-type RFID tag 104 is covered by a managed object 105.

Similarly to the first to third example embodiments, the case of a signal strength of a response signal from a first-type RFID tag 104 being less than the threshold value includes a case that the signal strength of the response signal is less than a lower reception limit of the UHF band RFID reader 103 and the response signal cannot be received, and a case that, since a signal strength of a transmission signal when the first-type RFID tag 104 receives the transmission signal from the UHF band RFID reader 103 is less than or equal to a lower operating limit of the first-type RFID tag 104, the first-type RFID tag 104 is not able to operate stably and is not able to respond to the transmission signal.

For example, in the example illustrated in the cross-sectional view in FIG. 12, the managed object 105*h* does not yet exist on the first-type RFID tag 104*k* placed at the left end of the drawing, and therefore the first-type RFID tag 104*k* is able to transmit a response signal at a signal strength greater than or equal to the threshold value. Accordingly, the UHF band RFID reader 103 is able to receive a strong response signal from the first-type RFID tag 104*k* along with tag information. The tag information is previously associated with a position of the first-type RFID tag 104*k*, and the UHF band RFID reader 103 determines from a signal strength of the response signal that the position related to the first-type RFID tag 104*k* is not covered by the managed object 105*h*.

On the other hand, an upper side of the first-type RFID tag 104*h* placed at the right end in the example illustrated in the cross-sectional view in FIG. 12 is almost covered by the managed object 105*h*, and therefore a signal strength of a response signal transmitted by the first-type RFID tag 104*h* is less than the threshold value. Accordingly, the UHF band RFID reader 103 determines that a position related to the first-type RFID tag 104*h* is covered by the managed object 105*h*. The UHF band RFID reader 103 also determines that the position related to the first-type RFID tag 104*h* is covered by the managed object 105*h* when the response signal from the first-type RFID tag 104*h* is not received within a predetermined certain period, as described above.

At that time, when tag information of the first-type RFID tag 104*h* cannot be obtained within the certain period, similarly to the first to third example embodiments, since the UHF band RFID reader 103 previously grasps that the first-type RFID tag 104*h* exists on a front surface of the reader antenna 102, the UHF band RFID reader 103 is able to determine that a position indicated by tag information of the first-type RFID tag 104*h* from which a response signal cannot be obtained within the certain period is covered by the managed object 105*h*. The certain period is determined by a number of first-type RFID tags 104 placed on the front surface of the reader antenna 102, a number of second-type RFID tags 1201 in positions where the tags can be read, and a tag reading speed of the UHF band RFID reader 103, and it is desirable that the period be a time in which tag information of a necessary and sufficient number of first-type RFID tags 104 and second-type RFID tags 1201 can be read.

Further, the UHF band RFID reader 103 is connected to a computer or functions as part of a computer, and determination of whether a position related to each first-type RFID tag 104 is covered by a managed object 105, that is, determination of presence or absence of the managed object 105 may be performed by the computer.

Furthermore, in the example illustrated in the cross-sectional view in FIG. 12, the managed object 105*h* is approaching and being separated from the first-type RFID tag 104*j* placed second from the left in the drawing. In such a case, a signal strength of a response signal transmitted by the first-type RFID tag 104*j* slightly decreases although the strength does not decrease to a signal strength of a response signal transmitted by the first-type RFID tag 104*h* almost completely covered by the managed object 105*h*. Accordingly, based on the slightly decreased signal strength of the response signal from the first-type RFID tag 104*j*, the UHF band RFID reader 103 is able to determine that the managed object 105*h* partially covers the first-type RFID tag 104*j*, or the managed object 105*h* is approaching and being slightly separated from the first-type RFID tag 104*j*.

Furthermore, by checking against signal strength information about a response signal of a neighboring first-type RFID tag 104 (the first-type RFID tag 104*k* and the first-type RFID tag 104*i*), the UHF band RFID reader 103 is able to estimate whether the managed object 105*h* partially covers the first-type RFID tag 104*j* or the managed object 105*h* is approaching and is slightly separated from the first-type RFID tag 104*j*. That is to say, the UHF band RFID reader 103 is able to determine a shape of the managed object 105*h* at granularity finer than intervals of the respective first-type RFID tags 104 and estimate a situation that the managed object 105*h* is floating above a first-type RFID tag 104.

It is important to securely grasp a shape and a floating state of the managed object 105*h* by increasing a change in a signal strength of a response signal depending on an approaching situation of the managed object 105*h*. As described above, the managed object 105*h* illustrated in FIG. 12 contains the shoe part 1202 and the human foot part 1203 and is composed of materials with different relative dielectric constants and electric conductivities. The human foot part 1203 in particular contains a large amount of water, and therefore has a relative dielectric constant around "30," and also has a high electric conductivity. On the other hand, a relative permeability is nearly "1." A case that operation of a tag antenna 112 of a first-type RFID tag 104 greatly changes depending on an approaching situation of the managed object 105*h* even under such circumstances holds when the tag antenna 112 is an electric-field antenna. That is to say, it is desirable that the tag antenna 112 of the first-type RFID tag 104 be an electric-field antenna. Further, a case that coupling between the reader antenna 102 and a tag antenna 112 of a first-type RFID tag 104 greatly changes depending on an approaching situation of the managed object 105*h* holds when a main coupling component between the reader antenna 102 and the tag antenna 112 of the first-type RFID tag 104 is electric-field coupling. That is to say, it is desirable that the reader antenna 102 and the tag antenna 112 of the first-type RFID tag 104 be electric field coupled.

On the other hand, it is important that a second-type RFID tag 1201 fixed to the managed object 105*h* can be stably and securely read without reading performance thereof being influenced by the managed object 105*h*, as long as the tag exists close to the reader antenna 102. Accordingly, unlike a first-type RFID tag 104, it is desirable that the tag antenna of the second-type RFID tag 1201 be a magnetic-field antenna. Further, it is desirable that the reader antenna 102 and the tag antenna of the second-type RFID tag 1201 be magnetic field coupled. Accordingly, it is desirable that the RFID tag 1201 be placed in such a way to readily capture a magnetic field generated by the reader antenna 102, and in the case of the fourth example embodiment, the second-type RFID tag 1201 is placed on a bottom surface side of the shoe part 1202 in the managed object 105*h*, as illustrated in FIG. 12.

The description of the operation of the UHF band RFID system 4 according to the fourth example embodiment will be continued. Specifically, in a state illustrated by FIG. 12, a situation that the managed object 105*h* representing a shoe worn by a walking person further approaches and separates from the reader antenna 102 will be described. First, as a heel in the shoe part 1202 further approaches the first-type RFID tag 104*h*, a signal strength of a response signal of the first-type RFID tag 104*h* where the heel part of the shoe part 1202 is positioned further decreases, and then, correspondingly to the approaching situation of the managed object 105*h*, signal strengths of response signals of the first-type RFID tag 104*i* and the first-type RFID tag 104*j* successively decrease. However a level of decrease in the signal strength of the response signal of the first-type RFID tag 104*i* positioned close to an arch part of the shoe part 1202 may be lower compared with that of another tag such as the first-type RFID tag 104*h* and the first-type RFID tag 104*j*. Such information can be utilized as useful information that the arch part of the shoe part 1202 exists in the position of the first-type RFID tag 104*i*.

As described above, the UHF band RFID system 4 according to the fourth example embodiment is able to grasp movement of the shoe part 1202 or the human foot part 1203 of the managed object 105*h*. Additionally, by generating a situation that tag information of the second-type RFID tag 1201*a*, the second-type RFID tag 1201*b*, and the second-type RFID tag 1201*c* can be successively read based on a situation of the shoe part 1202 of a walking person approaching the reader antenna 102, a ground contact situation of a specific shoe part 1202 or the foot part 1203 of the specific person, from a heel to a toe, can be precisely grasped.

For example, a risk of a fall by an aged person can be determined by utilizing information about an approaching situation during walking as described above, by having an aged person wear a shoe including the shoe part 1202 illustrated in FIG. 12. While a fracture due to a fall by an aged person is considered to be the biggest cause of getting into a nursing-care-requiring condition, a main cause of such a fall is generally attributed to inability to raise a toe, resulting in a stumble. Accordingly, a situation of inability to raise a toe can be securely grasped by detecting that time taken for the toe to contact the ground is shorter than a standard time, by applying the UHF band RFID system 4 according to the fourth example embodiment. A risk of stumbling and falling due to inability to raise a toe can be estimated by comparing such a situation with an able-bodied person, and statistically processing the situation.

The description above describes an example of a use of the UHF band RFID system 4 according to the fourth example embodiment, and it is needless to say that a use of the UHF band RFID system 4 is not limited to such a case and is able to acquire various information including other walking states such as a step, a speed, a pace, a step width, and a degree of tottering. Further, a walking direction, a direction of a foot or a toe, and the like can also be detected. Alternatively, by placing the UHF band RFID system 4 according to the fourth example embodiment on a floor at a workplace such as a distribution center and an office, information such as "who is working where, facing which direction" at a workplace such as a distribution center and an office may be collectively acquired.

Description of Effect of Example Embodiments

As has been described in detail in the aforementioned first to fourth example embodiments, the UHF band RFID system according to the present invention includes a reader antenna that is composed of a matched-terminated open-type transmission line and is connected to an RFID reader, and a first-type RFID tag installed, without being fixed to a managed object, in a managed object placement area in which the managed object is placed, the managed object placement area being a position where the first-type RFID tag is electromagnetic field coupled with the reader antenna, and is also capable of further including a second-type RFID tag that is different from the first-type RFID tag and is fixed to the managed object. Accordingly, the UHF band RFID system is able to securely grasp presence or absence of a managed object while identifying a location where the managed object exists from a size about the same as a tag, and also is able to securely identify both an object type and a location of the managed object.

Configurations of preferred example embodiments of the present invention have been described above. However, it should be noted that such example embodiments are merely exemplifications of the present invention and do not limit the present invention in any way. A person skilled in the art may easily understand that various modifications and changes may be made to the present invention, based on specific application purposes, without departing from the spirit of the present invention.

While the present invention has been described above with reference to the example embodiments, the present invention is not limited thereto. Various changes and modifications that can be understood by a person skilled in the art may be made to the configurations and details of the present invention, within the scope of the present invention.

REFERENCE SIGNS LIST

1 UHF band RFID system
2 UHF band RFID system
3 UHF band RFID system
4 UHF band RFID system
102 Reader antenna
102a Dielectric plate
102b Strip conductor, central conductor
102c Grounding conductor
103 UHF band RFID reader
104 First-type RFID tag
104a First-type RFID tag
104b First-type RFID tag
104c First-type RFID tag
104d First-type RFID tag
104h First-type RFID tag
104i First-type RFID tag
104j First-type RFID tag
104k First-type RFID tag
105 Managed object
105a Managed object
105b Managed object
105c Managed object
105d Managed object
105h Managed object
106 Spacer
107 Magnetic fixing plate
108 Decorative material
110 Managed object placement area
110a Managed object placement area
110b Managed object placement area
110c Managed object placement area
110d Managed object placement area
111 RFID chip
112 Tag antenna
701 Metallic plate
702 Resin plate
703 Second-type RFID tag
703a Second-type RFID tag
703b Second-type RFID tag
703d Second-type RFID tag
703e Second-type RFID tag
703f Second-type RFID tag
704 Magnet
711 RFID chip
712 Tag antenna
803 Second-type RFID tag
811 RFID chip
812 Tag antenna
1201 Second-type RFID tag
1201a Second-type RFID tag
1201b Second-type RFID tag
1201c Second-type RFID tag
1202 Shoe part
1203 Foot part
Rt Matched termination resistor

The invention claimed is:

1. A UHF band RFID system comprising:
   a reader antenna that is composed of a matched-terminated open-type transmission line and is connected to an ultra-high frequency (UHF) band radio frequency identification (RFID) reader; and
   a first-type RFID tag installed, without being fixed to a managed object, in a managed object placement area in which the managed object is placed, wherein
   a position of the managed object placed in the managed object placement area is a position where the reader antenna and an antenna of the first-type RFID tag are electric field coupled.

2. The UHF band RFID system according to claim 1, wherein
   an antenna of the first-type RFID tag is an electric-field antenna.

3. The UHF band RFID system according to claim 1, wherein
   a distance between the managed object when placed in the managed object placement area and the first-type RFID tag, and a line-of-sight distance between the reader antenna and an antenna of the first-type RFID tag are less than or equal to a wavelength of a radio signal used in communication between the UHF band RFID reader and the first-type RFID tag.

4. The UHF band RFID system according to claim 3, wherein
   a distance between the managed object when placed in the managed object placement area and the first-type RFID tag, and a line-of-sight distance between the reader antenna and an antenna of the first-type RFID tag are less than or equal to a value obtained by dividing a wavelength of a radio signal used in communication between the UHF band RFID reader and the first-type RFID tag by 2×the circular constant.

5. The UHF band RFID system according to claim 1, wherein
   the open-type transmission line is composed by using any one of a microstrip line, a coplanar line, a slot line, a balanced-two-wire transmission line, a triplate line, and a grounded coplanar line.

6. The UHF band RFID system according to claim 1, further comprising
   a second-type RFID tag that is fixed to the managed object and includes tag information for identifying the managed object, wherein,
   when the managed object is placed in the managed object placement area, the managed object is placed in a position where an antenna of the second-type RFID tag is magnetic field coupled with the reader antenna.

7. The UHF band RFID system according to claim 6, wherein
   an antenna of the second-type RFID tag is a magnetic-field antenna.

8. The UHF band RFID system according to claim 6, wherein
   a plurality of the second-type RFID tags are fixed to the managed object.

9. A UHF band RFID tag detection method comprising:

using a reader antenna that is composed of a matched-terminated open-type transmission line and is connected to an ultra-high frequency (UHF) band radio frequency identification (RFID) reader, and a first-type RFID tag installed, without being fixed to a managed object, in a managed object placement area in which the managed object is placed; and making a position of the managed object placed in the managed object placement area to be a position where the reader antenna and an antenna of the first-type RFID tag are electric field coupled.

10. The UHF band RFID tag detection method according to claim 9, further comprising:

using a second-type RFID tag that is fixed to the managed object and includes tag information for identifying the managed object, and making a position of the managed object placed in the managed object placement area to be a position where an antenna of the second-type RFID tag is magnetic field coupled with the reader antenna.

* * * * *

UNITED STATES PATENT AND TRADEMARK OFFICE
CERTIFICATE OF CORRECTION

PATENT NO. : 10,445,539 B2
APPLICATION NO. : 15/566255
DATED : October 15, 2019
INVENTOR(S) : Wataru Hattori Page 1 of 1

It is certified that error appears in the above-identified patent and that said Letters Patent is hereby corrected as shown below:

In the Specification

Column 28, Line 14; Delete "FIG. 62" and insert --FIG. 6-- therefor

Signed and Sealed this
Fourteenth Day of January, 2020

Andrei Iancu
*Director of the United States Patent and Trademark Office*